US011595113B1

(12) United States Patent
Dickinson et al.

(10) Patent No.: US 11,595,113 B1
(45) Date of Patent: Feb. 28, 2023

(54) SYSTEM TO PRESHAPE DATA SENT VIA SATELLITE

(71) Applicant: AMAZON TECHNOLOGIES, INC., Seattle, WA (US)

(72) Inventors: Andrew B. Dickinson, Seattle, WA (US); Daniel T. Cohn, Bainbridge Island, WA (US); Richard H. Galliher, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 133 days.

(21) Appl. No.: 17/008,927

(22) Filed: Sep. 1, 2020

(51) Int. Cl.
*H04B 7/185* (2006.01)
*H04B 7/204* (2006.01)
*H04B 7/195* (2006.01)

(52) U.S. Cl.
CPC ......... *H04B 7/18513* (2013.01); *H04B 7/195* (2013.01); *H04B 7/2041* (2013.01)

(58) Field of Classification Search
None
See application file for complete search history.

(56) References Cited

U.S. PATENT DOCUMENTS

| | | | | |
|---|---|---|---|---|
| 2002/0169550 A1* | 11/2002 | Perlmutter | .............. | G01S 19/49 701/472 |
| 2016/0164964 A1* | 6/2016 | Yeager | ................ | H04L 61/2528 709/226 |
| 2019/0364584 A1* | 11/2019 | Johnson | .............. | H04L 47/2483 |

OTHER PUBLICATIONS

Deering, S. et al., "Internet Protocol, Version 6 (IPv6) Specification", RFC 8200, DOI 10.17487/RFC8200, Jul. 2017, 44 pages. https://www.rfc-editor.org/rfc/pdfrfc/rfc8200.txt.pdf.

Kent, S., "IP Authentication Header", RFC 4302, DOI 10.17487/RFC4302, Dec. 2005, 36 pages. https://www.rfc-editor.org/rfc/pdfrfc/rfc4302.txt.pdf.

Moskowitz, R. et al., "Host Identity Protocol Version 2 (HIPv2)", RFC 7401, DOI 10.17487/RFC7401, Apr. 2015, 130 pages. https://www.rfc-editor.org/rfc/pdfrfc/rfc7401.txt.pdf.

* cited by examiner

*Primary Examiner* — Shripal K Khajuria
(74) *Attorney, Agent, or Firm* — Lindauer Law, PLLC

(57) ABSTRACT

Satellites provide communication between devices such as user terminals (UTs) and ground stations that are connected to points-of-presence (PoP) connected to other networks, such as the Internet. The PoP accepts downstream data addressed to the UT. A representation of the communication resources that are expected to be used to pass the downstream data from the PoP to the UT is determined and executed on one or more processors. The representations may include representations of traffic shapers, modems, and so forth at different points in the network. The representations may consider real-world and simulated feedback data. Within the representation, traffic shaping is employed to determine preshaped data that includes resource metadata designating the communication resources to be used. The preshaped data is passed along to the actual communication resources for subsequent delivery. The preshaping substantially improves performance of constrained communication resources. The preshaped data may be reshaped as real-world conditions change.

20 Claims, 9 Drawing Sheets

TARGET DELIVERY WINDOW DATA 168

| PARAMETER 502 | VALUE 504 |
|---|---|
| START | 2200 |
| ESTIMATED GS DELIVERY | 2205 |
| ESTIMATED SAT DELIVERY | 1109 |
| END | 2215 |
| DURATION | 15 |
| ... | ... |

COMMUNICATION RESOURCE DATA 170

| PARAMETER 502 | VALUE 504 |
|---|---|
| GROUND STATION ID. | CEDAR74 |
| TARGETED TIMESLOT | 15011 |
| SATELLITE ID | 3941 |
| G.S. UPLINK MODEM | 4 |
| UPLINK TIMESLOT START | 2201 |
| UPLINK TIMESLOT END | 2220 |
| SAT DOWNLINK MODEM | 293 |
| DOWNLINK TIMESLOT START | 2205 |
| DOWNLINK TIMESLOT END | 2215 |
| SUBBEAM ID | 7 |
| ... | ... |

UPLINK RESOURCE 442 { G.S. UPLINK MODEM, UPLINK TIMESLOT START, UPLINK TIMESLOT END }

DOWNLINK RESOURCE 444 { SAT DOWNLINK MODEM, DOWNLINK TIMESLOT START, DOWNLINK TIMESLOT END, SUBBEAM ID }

SYSTEM TO PRESHAPE DATA SENT VIA SATELLITE

BACKGROUND

Communications involving satellites servicing many user terminals introduce significant latencies due to propagation delay, traffic congestion, and other factors. This results in a complex environment in which providing an assured quality of service (QoS) for delivery of data using traditional techniques is not possible.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 5 illustrates data associated with operation of the system, according to some implementations.

Figure 1:
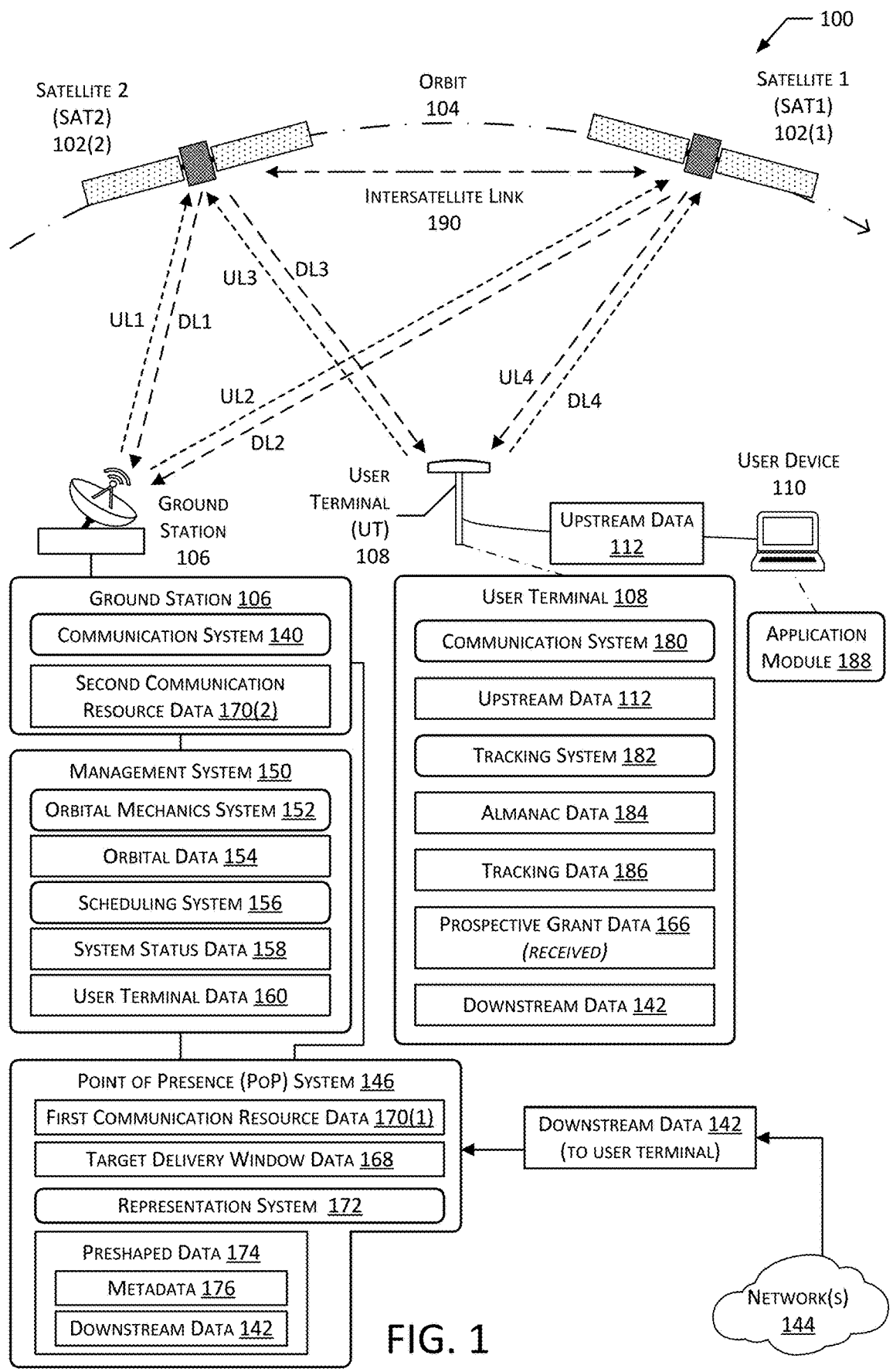
FIG. 1 illustrates a system that performs traffic shaping on downstream traffic to a user terminal (UT) based on a representation of communication resources, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. Compared to terrestrial wireless systems, the cost to place and maintain individual satellites, the large coverage area of a given satellite, and a substantial number of users served by each satellite, may result in an oversubscribed network that includes several bottlenecks that restrict the flow of network traffic. The situation is further complicated when the satellites are in non-geosynchronous orbits (NGO) and are in motion relative to a body such as the Earth. This constant motion results in a highly dynamic network in which propagation delays, ground stations, satellites, and other factors result in ongoing changes to communication resources used to provide communication service to user terminals (UTs). Described in this disclosure is a system that applies traffic shaping techniques to traffic soon after ingress. Traffic shaping uses various techniques, such as aggregation, reordering, pacing, and so forth to optimize transfer of data on a network. Aggregation may comprise combining two or more data packets to form a single data packet. Reordering may change the sequence in which packets are to be delivered. For example, packets that are time sensitive may be delivered before packets that are not. Pacing involves asserting a control as to when packets are sent. For example, pacing data may indicate that a minimum interval of time must elapse between sending a first packet and sending a second packet.

The traffic shaping is directed based on representations of the communication resources to be used. By applying traffic shaping techniques early and in anticipation of behavior of the network, the network is able to provide timely delivery of downstream data from one or more sources to a UT.

The satellites provide communication services between devices, such as user terminals (UT) located on or near the body. For example, a first UT on a first geographic location (geolocation) on the Earth may send upstream data to a first satellite that is in range of the first UT. The first satellite may send the upstream data to a ground station, another satellite, and so forth. Likewise, downstream data destined for the first UT may be received at a point-of-presence (PoP) and sent to the ground station that in turn sends the downstream data to the first satellite. The first satellite then sends the downstream data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth.

A period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. This results in a UT being frequently handed off from one satellite to another to maintain continuous communication services. In comparison, a geosynchronous satellite has an orbital period that coincides with the rotation of the earth, so a geosynchronous satellite appears to remain motionless with respect to the earth. While the apparent motionlessness with respect to the UT removes the need for handoffs, other drawbacks associated with the geosynchronous satellite remain.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency comprising 2 ms up to the satellite and 2 ms down to the UT. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

However, while the propagation delay introduced by use of an NGO satellite is less than that of geosynchronous satellites, the dynamic nature of the network using many NGO satellites may introduce additional latencies that may result in undesirable overall latencies between downstream data being received by a PoP and the ultimate delivery to the UT. Adding further complication is the asynchronous nature of downstream data received from the Internet. Downstream data from a server may suddenly appear at the PoP, such as in response to a request sent from the UT, and require timely delivery to the UT. Meanwhile, the configuration of communication resources used to send downstream data to the UT are changing as service is handed off from one satellite to another, link conditions change between the ground station and the satellite, downstream data from multiple sources is enqueued for transmission using a particular uplink modem, and so forth.

Traditional techniques of providing a particular level of quality of service (QoS) that provides a specified maximum delivery time of data rely on probabilistic models and operate in relatively static networks. For example, a terrestrial data network employing fiber optic links and radio links maintains fairly consistent performance during operation. While failover routing or load balancing across redundant links may be performed, the entire network is tightly controlled and largely deterministic. As a result, the effects of bottlenecks that impede traffic flow in a terrestrial data network are typically well characterized. For example, the modulation and coding used to send data on an operational transoceanic fiber optic cable will likely remain the same from one minute to another.

In comparison, traditional techniques of traffic management are infeasible in a dynamic environment. An NGO satellite network may involve thousands of satellites, hundreds of ground stations, millions of combinations of communication resources, constantly changing satellite configurations, dynamically changing modulation and coding, as well as variables associated with terrestrial operation such as variable delivery times for data from PoPs to ground stations. Additionally, the bottlenecks associated with terrestrial networks may be substantially less restrictive than those involved in operation of an NGO satellite network. For example, the consistency and bandwidth afforded by the use of a physical media in terrestrial networks such as coaxial cable, optical fiber, and so forth, result in bottlenecks that are less restrictive than communication links involving radio communication or free space optical communication.

Described in this disclosure are techniques for managing downstream traffic in a network that includes a constellation of satellites. Downstream data that is addressed to a particular UT is received by a first point-of-presence (PoP). For example, the PoP may be connected to the Internet and receive downstream data from a server.

The first PoP determines the UT that the downstream data is addressed to and determines first communication resource data. The first communication resource data specifies the communication resources, such as ground station, uplink modem at the ground station, satellite, downlink modem on the satellite, and so forth that would result in delivery of the downstream data to the UT. In some implementations the downstream data may comprise a plurality of data packets or other units of data transfer that are associated with delivery to the particular UT.

The first PoP maintains a representation system that is representative of at least a portion of the communication resources that are expected to be used to deliver the downstream data. The representation system may be representative of traffic shapers, buffers, modems, and so forth. For example, the first communication resource data may indicate that a first ground station is to be used to send downstream data to a first satellite that will in turn send the downstream data to the first UT. The first ground station has a first ground station transmit modem and a second ground station transmit modem. Each of these modems may have their own buffers to store data enqueued for transmission, may use different modulation and coding schemes at different times, and so forth. Similarly, the satellite may also have a first satellite to UT transmit modem and a second satellite to UT transmit modem.

The representation system maintains information about the state of the various communication resources that are associated with operation of the actual system. For example, if the representation system is implemented at the first PoP, the representation system may implement representations of the communication resources that are within the control or scope of operation of the first PoP, such as a network of ground stations, particular satellites during various timeslots, and so forth. The representation system may operate based on actual data obtained from the corresponding communication resources as well as representation data generated within the representation system.

The representation system may include representation counterparts of communication resources such as traffic shapers, modems, buffers, and so forth. The representation system provides for a representation of the operation of the communication resources with respect to one another. For example, downstream data provided as input to a representation traffic shaper at a representation ground station would produce predictable output consistent with that of an actual traffic shaper at an actual ground station. In some implementations the representation system may comprise a simulation or emulation of the communication resources.

The representation system may operate at a faster cycle time or internal processing cadence, compared to that used during operation of the actual communication resources. For example, the representation system may determine in 1 millisecond the preshaped data that corresponds to a set of operations in the actual communication resources that would take 10 milliseconds of actual clock time to perform. In some implementations the representation system may test several different sets of candidate preshaped data. Each set of candidate preshaped data may be tested by the representation system to determine which provides an optimal outcome, such as lowest latency, greatest overall data throughput per unit time, least number of dropped packets, and so forth.

The downstream data is processed by the representation system that produces preshaped data. The preshaped data may include metadata as well as downstream data. For example, the preshaped data may comprise packets from the downstream data that have been aggregated, reordered, associated with particular pacing, and so forth. The metadata may be indicative of the packets to be aggregated, ordering of the packets for transmission, timing information to produce a desired pacing, and so forth. The preshaped data is shaped to account for delivery using the communication resources associated with that delivery. For example, the preshaped data may be preshaped to facilitate transmission from the first PoP to the first ground station, as well as to facilitate transmission from the first ground station to the first satellite using a particular ground station transit modem. Continuing the example, the ground station preshaped data may also be preshaped to facilitate transmission from the first satellite to the first UT using a particular satellite to UT transmit modem.

By preshaping the downstream data using the representation system, the subsequent communication resources are able to be utilized more effectively and without necessarily having to perform traffic shaping prior to a given network bottleneck. For example, the preshaped data may be processed by the respective communication resources in accord with the metadata. This substantially reduces delay and complexity of those resources. For example, the first ground station may receive the preshaped data and immediately queue for transmit using the ground station transmit modem indicated by the metadata in the specified order and pacing. As a result, the first ground station may not need to perform any traffic shaping functions.

As the communication resources become more constrained, the benefits provided by the representation system become more substantial. The resources available onboard a satellite may be substantially constrained, with computational capabilities, memory, bandwidth, and so forth limited by mass and power constraints. For example, a satellite has a limited budget of electrical power and mass that can be associated with a payload such as processors, memories, transceivers, antennas, and so forth. The satellite receives the preshaped data including the metadata. For example, the preshaped data may also be ordered for transmission by the satellite to UT transmit modem. That particular modem may be designated in the metadata. The complexity of the traffic shaping tasks that would otherwise have required onboard computing resources of the satellite is thus reduced or avoided altogether. As a result, the satellite may use lower power processors, carry less onboard memory, and so forth.

In addition to the preshaping performed by the representation system, further traffic shaping may take place elsewhere in the network. For example, a sudden decrease in data throughput at a ground station modem due to unexpected changes in weather conditions may result in reshaping at the ground station to accommodate this change. Information about this decreased data throughput may be provided to the representation system, so that new downstream data entering the system is able to be preshaped accordingly.

By using the system and techniques described in this disclosure, overall efficiency of a communication system using a satellite constellation is substantially improved and latency to deliver downstream data to one or more UTs is improved. The use of the preshaped data produced by the representation system may allow for reduction or complexity of the communication resources. For example, a traffic station at the ground station may be omitted and the preshaped data may be used without further processing.

The ongoing assessment at each element by the representation system and the preprocessing that results in the preshaped data substantially reduces overall latencies by maximizing utilization of the dynamic system. This improves operation in an oversubscribed configuration in which a total aggregate data transfer rate of all UTs serviced by a ground station or satellite exceeds the maximum data transfer rate of that ground station or satellite.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminal (UTs) 108, a user device 110, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

One or more ground stations 106 comprise facilities that are in communication with one or more satellites 102. The ground stations 106 may pass data between the satellites 102, a management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data or other data between the one or more communication networks and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data that indicates when communication is to be transferred from the first satellite 102(1) to the second satellite 102(2). Continuing the example, the scheduling system 156 may also specify communication parameters such as frequency, timeslot, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service.

Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of user data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to user data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system 180 to establish communication with one or more satellites 102. The communication system 180 of the UT 108 may include components similar to those of the communication system 212 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes user data between the constellation of satellites 102 and the user device 110. The user data includes data originated by the user device 110 (upstream data 112) or data addressed to the user device 110 (downstream data 142).

The downstream data 142 may comprise header data and payload data. For example, packets compliant with Internet Protocol (IP) may include a packet fixed header, a packet extension header, a packet payload, and so forth. For example, the packet fixed header may comprise version data, traffic class data, flow label data, source address, destination address, and so forth. In another example, the packet extension header may comprise routing data, fragmentation data, authentication data, encapsulating security data, destination option data, host identity protocol data, and so forth. In some implementations, the traffic shapers, representation or actual, may utilize header data associated with downstream data 142. For example, packet header data may be used by a traffic shaper to determine whether to aggregate, reorder, pace, or any combination thereof, one or more packets.

One or more of the packet fixed header or the packet extension header may be implemented consistent with the Internet Protocol Version 6 (IPv6) specification promulgated by the Internet Engineering Task Force (IETF). (See Deering, S., "Internet Protocol, Version 6 (IPv6) Specification", RFC 8200, DOI 10.17487/RFC8200, July 2017, www.rfc-editor.org/info/rfc8200.) For example, the version data indicates the version of internet protocol in use. The traffic class data indicates the class of data for use in differentiated services and explicit congestion notification. The flow label may comprise data provided by a source of the downstream data 142 to label sequences of packets that are to be treated as a single flow. The source address is indicative of the source of the downstream data 142. The destination address is indicative of the destination address to which the downstream data 142 is to be delivered. The routing data is indicative of one or more intermediate network nodes that were used to transfer the packet. The fragment data is data that is used by a source of the downstream data 142 to indicate that data having a bit size larger than would otherwise fit within a single message transfer unit to the destination has been fragmented across several packets. The authentication header data and encapsulating security data are indicative of authentication and encapsulation associated with the downstream data 142. (See Kent, S., "IP Authentication Header", RFC 4302, DOI 10.17487/RFC4302, December 2005, www.rfc-editor.org/info/rfc4302.) The destination option data may comprise optional information to be examined by a destination node. The host identity protocol data may comprise data such as digital certificates to implement a host identity name space. (See Moskowitz, Ed., "Host Identity Protocol Version 2 (HIPv2)", RFC 7401, DOI 10.17487/RFC7401, April 2015, www.rfc-editor/info/rfc7401.)

The UT 108 may be fixed or in motion. For example, the UT 108 may be used at a residence or on a vehicle such as a car, boat, aerostat, drone, airplane, and so forth. The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time of flight correction, or other information associated with a specified time. The determination of the tracking data 186 may be ongoing. For example, the first UT 108 may determine tracking data 186 every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 190 provides for communication between satellites 102 in the constellation.

A device, such as a server, uses one or more networks 144 to send downstream data 142 that is addressed to a UT 108 or a user device 110 that is connected to the UT 108. The system 100 may include one or more PoP systems 146. Each PoP system 146 may comprise one or more servers or other computing devices at a facility, such as on Earth. Separate PoP systems 146 may be located at different locations in different facilities. In one implementation, a PoP system 146 may be associated with providing service to a plurality of UTs 108 that are located in a particular geographic region.

In this illustration, a first PoP system 146 at a facility accepts the downstream data 142 and proceeds to attempt delivery of the downstream data 142 to the UT 108. The PoP system 146 is in communication with one or more ground stations 106(1), 106(2), . . . , 106(G) and the management system 150. In some implementations one or more functions may be combined. For example, the PoP system 146 may perform one or more functions of the management system 150. In another example, the PoP system 146 may include an integrated ground station 106.

The PoP system 146 may provide several functions including determining a timeslot and communication resources, generating preshaped data, and so forth. One function is to assign a targeted timeslot to the downstream data 142. For example, scheduling handoffs of UTs 108 from one satellite 102 to another may be scheduled on 5 second intervals. The targeted timeslot may indicate a particular 5 second interval within which the downstream data 142 is expected to be delivered. The targeted timeslot may already be in progress. For example, the targeted timeslot assigned to the downstream data 142 may have begun 3 seconds before the downstream data 142 was received.

The PoP system 146 determines the UT 108 that the downstream data 142 is addressed to and determines first communication resource data 170(1). The first communication resource data 170(1) specifies the communication resources, such as ground station 106, uplink modem at the ground station 106, satellite, downlink modem on the satellite, and so forth that would result in delivery of the downstream data 142 to the UT 108. The downstream data 142 may comprise a single packet or other unit of data transfer, or a plurality of packets or other units of data transfer that are associated with delivery to the particular UT 108.

The PoP system 146 determines, based on the first communication resource data 170(1), target delivery window data 168 indicative of a target delivery window. This target delivery window is indicative of the first PoP system's 146 assessment of how long it should take for the downstream data 142 to be delivered to the UT 108. The target delivery window may take into consideration the expected delays associated with the uplinks and downlinks specified by the first communication resource data 170(1) to deliver the downstream data 142. Data such as historical delays, orbital data 154, system status data 158, and so forth may be used to determine the target delivery window data 168. For example, the target delivery window may be 27 ms long and expires at a specified time.

The first communication resource data 170(1) is indicative of the resources to be used. Operation of the system 100 may be improved by using a representation system 172 to determine preshaped data 174 comprising metadata 176 and the downstream data 142. The representation system 172 is representative of at least a portion of the communication resources that are expected to be used to deliver the downstream data 142. The representation system 172 may be representative of traffic shapers, buffers, modems, and so forth. For example, the first communication resource data 170(1) may indicate that a first ground station 106(1) is to be used to send downstream data 142(1) to a first satellite 102(1) that will in turn send the downstream data 142(1) to the first UT 108(1). The first ground station 106(1) has a first modem and a second modem. Each of these modems may have their own buffers to store data enqueued for transmission, may use different modulation and coding schemes at different times, and so forth. Similarly, the satellite 102 may have a third modem and a fourth modem used to transmit data to the UTs 108 serviced by that satellite 102. Each of these devices may experience contention for their use that is influenced by operation of the system 100 as well as external factors. For example, the first modem may be tasked with providing communication with the first satellite 102(1) while the second modem is tasked with providing communication with the second satellite 102(2). Likewise, the third modem may be providing communication to UTs 108 within a first subbeam while the fourth modem provides communication to UTs 108 within a second subbeam.

The representation system 172 may maintain information about the state of the various communication resources that are associated with operation of the actual system. For example, if the representation system 172 is implemented at the first PoP system 146(1), the representation system 172 may implement representations of the communication resources that are within the control or scope of operation of the first PoP system 146(1), such as a network of ground stations 106, particular satellites 102 during various timeslots, particular resources onboard particular satellites 102, and so forth. The representation system 172 may operate based on actual data obtained from the corresponding communication resources, representation data generated within the representation system 172, or both.

The representation system 172 may include representation counterparts of communication resources such as traffic shapers, modems, buffers, and so forth. The representation system 172 provides for a representation of the operation of the communication resources with respect to one another. For example, downstream data 142 provided as input to a representation traffic shaper at a representation ground station would produce predictable output consistent with that of an actual traffic shaper at an actual ground station 106. In some implementations the representation system 172 may comprise a simulation or emulation of the communication resources. The accuracy of the representation provided by the representation system 172 may be less than complete. For example, the representation system 172 may operate with a reduced fidelity compared to the actual devices. Continuing the example, the reduced fidelity may result from replacing complex operations with approximations.

The representation system 172 may operate at a faster cycle time or internal processing cadence, compared to that used during operation of the actual communication resources. For example, the representation system 172 may determine in 1 millisecond the preshaped data 174 that corresponds to a set of operations in the actual communication resources that would take 10 milliseconds of actual clock time to perform by those actual devices. In some implementations the representation system 172 may test several different sets of candidate preshaped data. Each set of candidate preshaped data may be tested by the representation system 172 to determine which provides an optimal outcome, such as lowest latency, greatest overall data throughput per unit time, least number of dropped packets, and so forth. A selected set of candidate preshaped data may then be designated for and subsequently used as the preshaped data 174.

In one implementation, the representation system 172 may consider the downstream data 142 in an order that is opposite that of actual flow of downstream data 142 through the actual communication resources. For example, the representation system 172 may begin with considering the downstream data 142 as present at a representation of the UT 108. The representation system 172 may then operate in reverse fashion, determining how the downstream data 142 should be shaped to produce the desired result of the downstream data 142 at the UT 108.

In another implementation, the representation system 172 may represent movement of the downstream data 142 in an order that is consistent with the use of the actual communication resources. For example, the representation system 172 may accept the downstream data 142 at a representation PoP and determine shaping at successive steps such as from the representation PoP to a representation ground station 106, from the representation ground station to the representation satellite 102, and so forth.

The representation system 172 processes the downstream data 142 and produces preshaped data 174. The preshaped data 174 may include metadata 176 as well as downstream data 142. For example, the preshaped data 174 may comprise packets from the downstream data 142 that have been aggregated, reordered, associated with particular pacing, and so forth. The metadata 176 may be indicative of the packets to be aggregated, ordering of the packets for transmission, timing information to produce a desired pacing, and so forth. The preshaped data 174 is shaped to account for delivery using the communication resources associated with that delivery. For example, the preshaped data 174 may be preshaped to facilitate transmission from the first PoP system 146(1) to the first ground station 106(1), as well as to facilitate transmission from the first ground station 106(1) to the first satellite 102(1) using a specified first modem. Continuing the example, the preshaped data 174 may also be preshaped to facilitate transmission from the first satellite 102(1) to the first UT 108(1) using a specified third modem onboard the first satellite 102(1).

By preshaping the downstream data 142 using the representation system 172, the subsequent communication resources are able to be utilized more effectively and without necessarily having to perform traffic shaping prior to a given network bottleneck. For example, the preshaped data 174 may be processed by the respective communication resources in accord with the metadata 176. This substantially reduces delay and complexity of those resources downstream of the representation system 172. For example, the first ground station 106(1) may receive the preshaped data 174 and immediately queue for transmit using the first modem indicated by the metadata 176, in the specified order and pacing. The preshaped data 174 has already been aggregated, ordered, and has pacing data consistent with the representation system's 172 representation of the operation of those actual resources. As a result, the downstream resource, such as the ground station 106(1), needs to do little or no further traffic shaping to optimize transfer of the downstream data 142. In the event conditions dictate, such as due to a change in operation of an actual device that is unexpected by the representation system 172, traffic shaping techniques may be further applied to the preshaped data 174.

Based on the first communication resource data 170(1), the first PoP system 146 sends the preshaped data 174 to a first ground station 106(1). In some implementations the first PoP system 146 may also send the target delivery window data 168 and at least a portion of the first communication resource data 170(1) to the first ground station 106(1). The first ground station 106(1) receives this information and in some implementations determines whether the downstream data 142 in the preshaped data 174 can be delivered before the end of the target delivery window to the first UT 108 using the communication resources available to the first ground station 106(1). If not, the first ground station 106(1) may send the information along to a second ground station 106(2), send an error message to the first PoP system 146, or take other action.

Some time has passed between the representation system 172 determining the preshaped data 174 and the first PoP system 146 determining first communication resource data 170(1) and the arrival of the preshaped data 174 at the first ground station 106(1). As a result, the communication resources originally specified by the first PoP system 146 in the first communication resource data 170(1) may no longer be available or suitable for accomplishing delivery within the target delivery window. Similarly, conditions may have changed that may result in a reshaping of the preshaped data 174.

The first ground station 106(1) assesses the target delivery window data 168 and available information associated with operation of the ground station 106 and the management system 150 to determine if the first communication resource data 170(1) specified by the PoP system 146 is available and suitable for sending the downstream data 142 to a first satellite 102 for delivery to the UT 108 before the end of the target delivery window. If so, the first ground station 106(1) proceeds to use the communication resources specified by the first communication resource data 170(1). Likewise, with the operation of the ground station 106 being consistent with those anticipated by the representation system 172, the preshaped data 174 may be used as is. In some implementations consistency may be determined based on whether a difference between the first communication resource data 170(1) and actual communication resources used exceeds a threshold value.

In some situations, the communication resources specified in the first communication resource data 170(1) may no longer be suitable for sending the downstream data 142 to the UT 108 before the end of the target delivery window. The first ground station 106(1) may determine second communication resource data 170(2) based on the target delivery window data 168 that indicates other communication resources to be used. For example, the second communication resource data 170(2) may specify the use of a different uplink modem, compared to the first communication resource data 170(1), for transmission to the satellite 102. These or other changes may result in reshaping of the preshaped data 174. For example, a change in modulation and coding of a modem at the first ground station 106(1) may change data throughput. This change relative to the information used by the representation system 172 to generate the preshaped data 174 may result in less than optimal transfer of data. As a result, the preshaped data 174 may be further processed using one or more traffic shaping techniques.

The preshaped data 174 is sent to the first satellite 102(1). In some implementations, the target delivery window data 168 and latest communication resource data 170 are also sent to the first satellite 102(1). The first satellite 102(1) may use this information to determine third communication resource data 170(3) indicative of communication resources to send the downstream data 142 in the preshaped data 174 to the UT 108. For example, the second communication resource data 170(2) may specify a first downlink modem for the first satellite 102(1) to use in sending the downstream data 142 to the UT 108. If the delivery of the downstream data 142 is expected to be completed before the end of the target delivery window, the first satellite 102(1) may use the first downlink modem. However, if delivery of the downstream data 142 is not expected to be completed before the end of the target delivery window, the downstream data 142 may be allocated for transmission using a second downlink modem.

If the first satellite 102(1) is deemed unable to complete the transmission to the UT 108 before expiration of the target delivery window, the first satellite 102(1) may attempt to use other communication resources to complete the delivery. For example, the first satellite 102(1) may send at least a portion of the preshaped data 174 and, in some implementations, other data such as the target delivery window data 168 to a second satellite 102(2) via the inter-satellite link 190. The second satellite 102(2) may then proceed to send the downstream data 142 to the UT 108. For example, if the first satellite 102(1) will be out of range of the UT 108 before the downstream data 142 can be transmitted, the first satellite 102(1) may forward the downstream data 142 to the second satellite 102(2) to complete delivery.

By using the system 100 as described herein, downstream data 142 is able to be delivered with improved throughput in a dynamic network environment that includes multiple bottlenecks or constraints. System efficiency is maximized by using the preshaped data 174. Latency may also be reduced. The system 100 also substantially reduces the complexity of resources downstream of the representation system 172, such as the ground stations 106 and satellites 102 to perform traffic shaping techniques using onboard resources. For example, the satellite 102 may receive the preshaped data 174 and use that preshaped data 174 for delivery with no or minimal processing. For example, the preshaped data 174 may optimize transfer of data through a constrained resource such as a downlink modem on a satellite 102, without the need for the satellite 102 to use compute resources to perform the traffic shaping.

Additional details associated with operation of the PoP system 146, the ground station 106, the satellites 102, and so forth are discussed in more detail with regard to FIGS. 3-6. The representation system 172 is discussed in more detail with regard to FIGS. 7-9.

The satellite 102, the ground station 106, the user terminal 108, the user device 110, the management system 150, or other systems described herein may include clocks. These clocks may be synchronized to a common source. In some implementations the clock may be a global positioning system (GPS) disciplined clock or an atomic clock that provides a high accuracy and high precision time source. Output from the clock may be used to coordinate operation of the system 100.

Various configurations of the systems described in this disclosure may be used. In one implementation, the ground station 106, PoP system 146, management system 150, and the representation system 172 may be present at different physical locations. For example, ground stations 106 may be present at different locations on the Earth to provide desired communication coverage with the satellites 102. Continuing the example, a first PoP system 146 comprising one or more servers may be located in a first datacenter. The first PoP system 146 may be tasked with providing communication services to a particular network, for devices within a particular geographic region, and so forth. For example, the first PoP system 146 may be collocated in a datacenter with network connections to the Internet. The management system 150 may comprise one or more servers at a second datacenter. The management system 150 may communicate with the individual PoP systems 146, the ground stations 106, the satellites 102, the UTs 108, and so forth.

The representation system 172 may be collocated with the PoP system 146 or may operate a separate system between the network 144 and one or more PoP systems 146. In one implementation, the representation system 172 may operate to provide a representation of downstream communication resources relative to its position in the system 100. For example, if the representation system 172 is implemented at the PoP system 146, the representation system 172 may include representations of the ground station 106, satellites 102 serviced by the ground station 106, and UTs 108 serviced by those satellites 102.

The satellite 102, the ground station 106, the user terminal 108, the user device 110, the management system 150, the PoP system 146, the representation system 172, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 2:
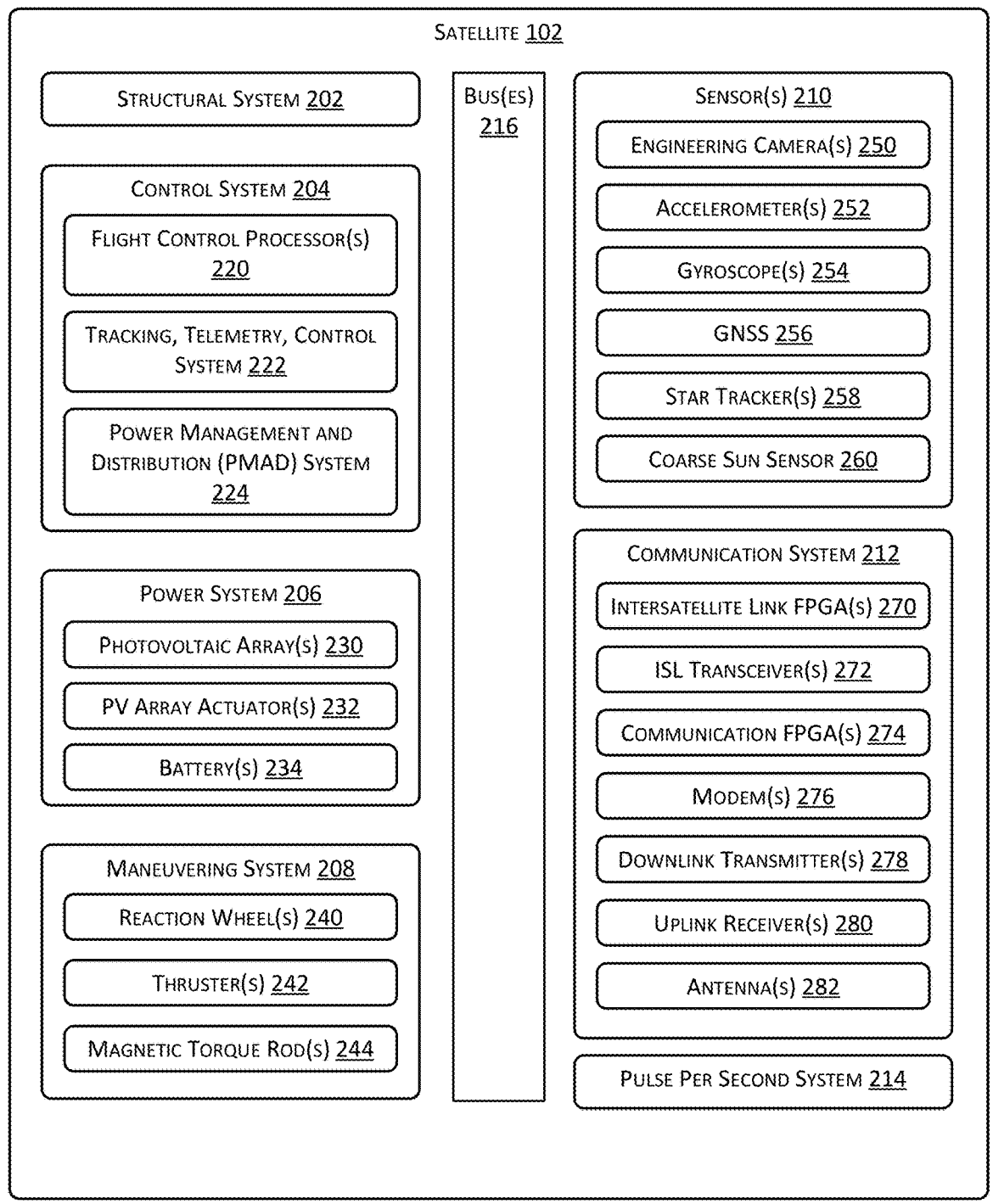
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more busses 216 may be used to transfer data between the systems onboard the satellite 102. In some implementations, redundant busses 216 may be provided. The busses 216 may include, but are not limited to, data busses such as Controller Area Network Flexible Data Rate (CAN FD), Ethernet, Serial Peripheral Interface (SPI), and so forth. In some implementations the busses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102 due to the gain.

The beam provided by the satellite 102 may comprise a plurality of subbeams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include hardware to support the intersatellite link 190. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The communication system 212 may implement one or more traffic shaping techniques to perform traffic shaping on data transmitted by the satellite 102. For example, the communication FPGAs 274 may implement traffic shaping techniques on data to be sent using the downlink transmitter 278. In another example, the intersatellite link FPGAs 270 may implement traffic shaping techniques on data to be sent using the ISL transceivers 272.

Figure 3:
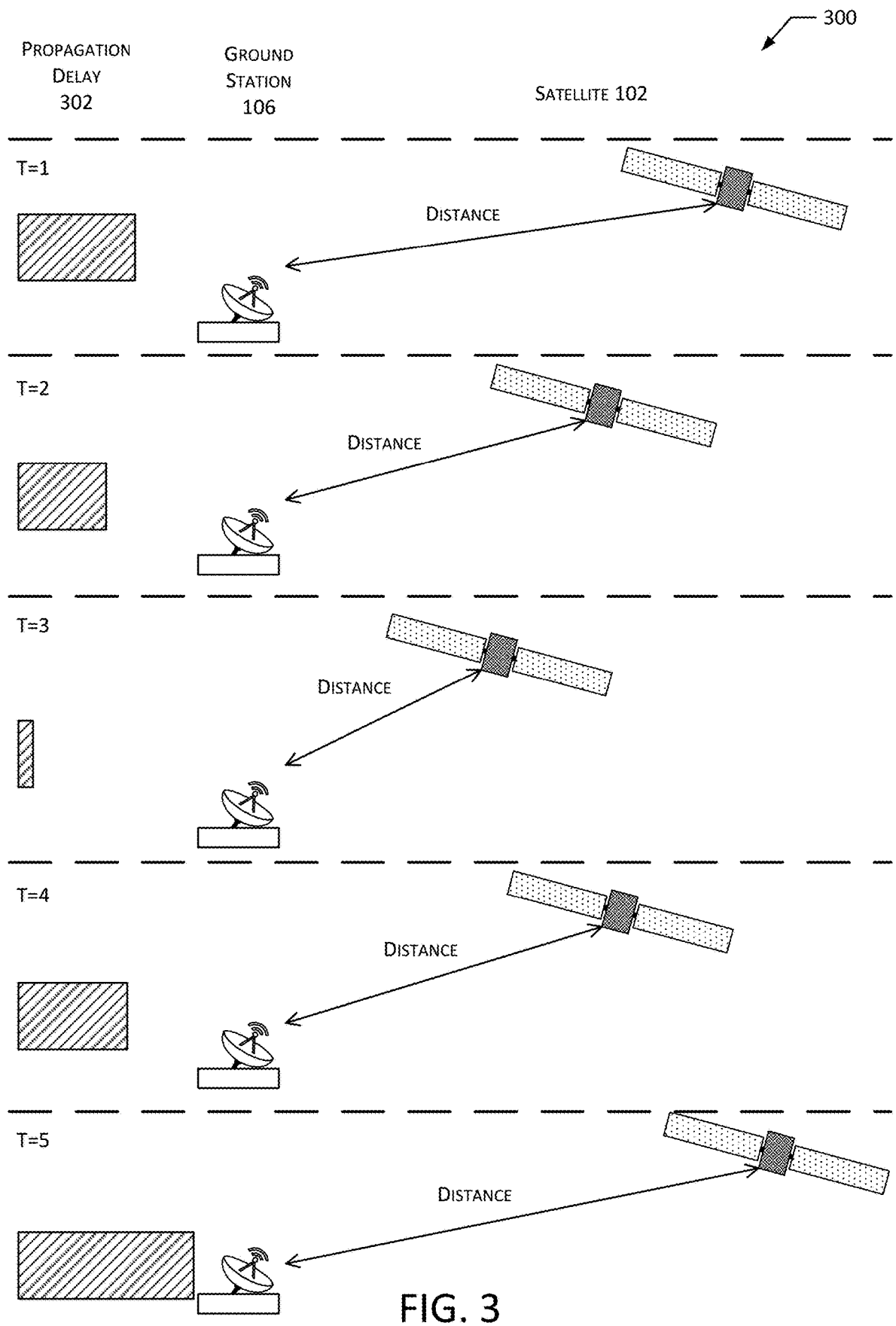
FIG. 3 illustrates changes in propagation delay that affect latency due to movement of a satellite in a non-geosynchronous orbit (NGO).

FIG. 3 illustrates changes in propagation delay 302 that affect latency due to movement of a satellite 102 in a non-geosynchronous orbit (NGEO). A propagation delay 302 results from the time it takes a signal to travel a distance between two stations, such as the ground station 106 and the satellite 102. While not shown here, a propagation delay 302 also occurs between the satellite 102 and the UT 108.

A position of the satellite 102 in a non-geosynchronous orbit 104 changes over time, changing a distance between the ground station 106 and the satellite 102. Because the electromagnetic signal has a maximum speed of "c", as the distance changes so too does the amount of time it takes for a signal to travel between the ground station 106 and the satellite 102. In one implementation, the propagation delay 302 may be determined by dividing the distance by c. In other implementations other factors may be considered, such as the portion of the distance that passes through the atmosphere, maximum time error that still allows communication, relativistic effects, and so forth.

The distance between the ground station 106 and the estimated location of the satellite 102 may be calculated given the known geolocation of the ground station 106 and the orbital data 154. For example, a predicted position of the satellite 102 may be calculated at a particular time using the orbital data 154. The distance may then be calculated based on the known geolocation and the predicted position of the satellite 102. The distance "D" may also be known as the "slant range". The distance may be calculated using the following equations:

$$r = h + B$$

where r=distance between the geocenter of Earth and the satellite and

B is a distance between the geocenter and the ground station 106

(Equation 1)

$$D = \sqrt{(B \cdot \cos(\epsilon))^2 + r^2 - B^2} - B \cdot \cos(\epsilon)$$ where $\epsilon$ is an elevation angle to the satellite relative to local vertical (Equation 2)

In this illustration a bar graph depicting a relative magnitude of a propagation delay 302 is shown for times t=1, 2, 3, 4, and 5. Also shown is the ground station 106 and the satellite 102 that is providing communication services. As time progresses, distance between the satellite 102 and the ground station 106 changes due to the relative motion of the satellite 102 with respect to the Earth where the ground station 106 is placed. At time t=1 where the distance is relatively large, the propagation delay 302 is relatively large. As the distance decreases to time t=3, so too does the propagation delay 302. As a result of this changing propagation delay 302, the overall delay associated with sending data to the satellite 102 will change from one time to another. Likewise, the overall delay associated with sending data from the satellite 102 to the UT 108 will also change from one time to another.

Figure 4:
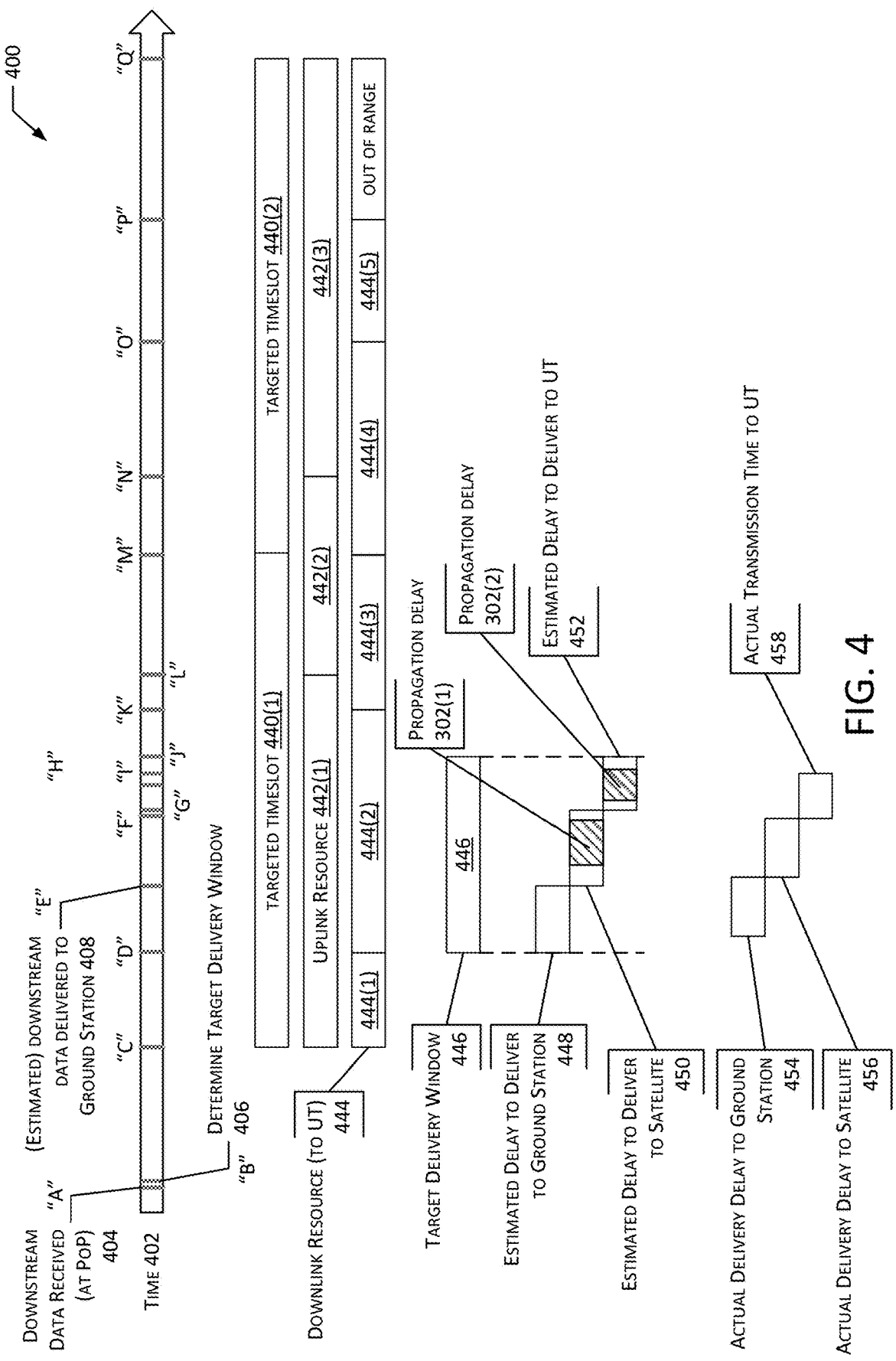
FIG. 4 illustrates a timeline of downstream data being allocated to a particular targeted timeslot for delivery to the UT and associated intervals taken into consideration, according to some implementations.

FIG. 4 illustrates a timeline 400 of downstream data 142 included in the preshaped data 174 being allocated to a particular targeted timeslot for delivery to the UT 108 and associated intervals taken into consideration, according to some implementations. The timeline 400 is not necessarily depicted to scale. For example, the targeted timeslots 440 may be 5,000 milliseconds (ms) in duration while the target delivery window 446 is 30 ms in duration.

Time 402 is depicted as increasing from left to right. Various points in time 402 are indicated with reference letters "A", "B", "C", and so forth.

At 404 as indicated at time "A", downstream data 142 is received at a PoP system 146. The downstream data 142 is associated with a targeted timeslot 440. For example, the downstream data 142 may be associated with the targeted timeslot 440(1). The system 100 may use the targeted timeslots 440 to coordinate operations such as communication handovers. For example, communication handovers in which a UT 108 is transitioned from one satellite 102 to another may be performed at 5 second intervals when necessary.

At 406 as indicated at time "B", the PoP system 146 determines the target delivery window data 168 and the first set of communication resource data 170(1). The target delivery window data 168 is indicative of a target delivery window 446. The target delivery window 446 is indicative of an assessment as to how long it should take for the downstream data 142 to be delivered to the UT 108 when sent by a given part of the system 100, such as the PoP system 146. In this illustration, the target delivery window 446 extends from time "D" to "J".

The PoP system 146 may use data provided by the management system 150. The PoP system 146 determines the UT 108 associated with the downstream data 142. For example, the PoP system 146 may send a UT identifier to the management system 150 and data indicative of the targeted timeslot 440. The management system 150 may provide data indicative of which satellite(s) 102 will be in range of the UT 108 and for how long during the targeted timeslot 440 and which ground station(s) 106 will be in range of those satellites 102 and for how long during the targeted timeslot 440.

The PoP system 146 may determine uplink resources 442 and downlink resources 444 available during at least the targeted timeslot 440. The uplink resources 442 may comprise systems such as ground station uplink modems, transmitters, antennas, and so forth. The downlink resources 444 may comprise systems such as one or more modems 276 and their associated downlink transmitters 278. The uplink resources 442 and the downlink resources 444 are discussed in more detail with regard to FIG. 5. Availability of these communication resources may be affected by internal and external factors. Internal factors, for example, may include modulation and coding in use, data transfer rates, queue depth, equipment being offline due to maintenance, and so forth. External factors, for example, may include propagation changes, weather effects, orbital motion, and so forth. These factors may introduce delays to the delivery of the downstream data 142.

The availability of particular uplink resources 442 or downlink resources 444 with respect to time 402 may vary as a result from the interaction of these factors. For example, the orbital motion of the satellites 102, different communication hardware and antenna configurations, potentially different geographic locations of the ground station 106 and the UTs 108, and so forth can produce situations in which an uplink from the ground station 106 to the satellite 102 may be available for a longer time 402 than a downlink from the satellite 102 to a particular communication resource such as a subbeam of the UT 108. In this illustration, the timeline is shown with respect to a particular UT 108. The uplink resource 442(1) for communication from the ground station 106 to the satellite 102 extends from time "C" to "L". In comparison, downlink resource 444(1) extends from time "C" to "D", downlink resource 444(2) extends from "D" to "K", and downlink resource 444(3) extends from "K" to "M".

Based on the determined uplink resources 442 and the downlink resources 444 available, the PoP system 146 determines first communication resource data 170(1). The first communication resource data 170(1) is indicative of at least a portion of the communication resources that are determined to be used for delivering the downstream data 142 to the UT 108. For example, the first communication resource data 170(1) may specify the first ground station 106(1), a particular uplink modem at the first ground station 106(1), the first satellite 102(1), a particular downlink modem at the first satellite 102(1), and so forth. The communication resource data 170 is discussed in more detail with regard to FIG. 5.

The PoP system 146 uses the communication resources indicated by the first communication resource data 170(1) to determine the target delivery window data 168. Data such as historical delays, system status data 158, and so forth for those communication resources may be used to determine the target delivery window data 168. For example, historical delays may comprise information such as a minimum latency, maximum latency, average latency, and so forth for a communication resource.

While determining the target delivery window 446, the PoP system 146 may include an estimated delay to deliver 448 from the PoP system 146 to the ground station 106. For example, the estimated delay to deliver 448 may comprise an average latency measured along a fiber optic terrestrial connection that connects the PoP system 146 to the ground station 106. In this illustration, the estimated delay to deliver 448 extends from time "D" to "E". At 408, indicated at time "E", the PoP system 146 estimates the downstream data 142 should be delivered to the ground station 106.

While determining the target delivery window 446, the PoP system 146 may include an estimated delay to deliver 450 from the ground station 106 to the satellite 102. For example, the estimated delay to deliver 450 may comprise an average latency measured for a first modem that is used as part of the uplink to the satellite 102. In this illustration, the estimated delay to deliver 450 extends from time "E" to "G".

In some implementations the estimated delay to deliver 450 to the satellite 102 may include the propagation delay 302(1). The propagation delay 302(1) may be based on the location of the ground station 106 and a predicted position of the satellite 102 at a time associated with transmitting the downstream data 142 to the satellite 102.

While determining the target delivery window 446, the PoP system 146 may include an estimated delay to deliver 452 from the satellite 102 to the UT 108. For example, the estimated delay to deliver 452 may comprise an average latency measured for a downlink modem of the satellite 102. In this illustration, the estimated delay to deliver 452 extends from time "G" to "J".

The estimated delay to deliver 452 to the UT 108 may include the propagation delay 302(2). The propagation delay 302(2) may be based on the predicted position of the satellite 102 and the location of the UT 108 at a time associated with transmitting the downstream data 142 from the satellite 102.

In one implementation, the target delivery window 446 may comprise the sum of the estimated delays to deliver 448, 450, and 452. A start time and an end time of the target delivery window 446 may be based on one or more of the uplink resources 442, the downlink resources 444, or other information.

The target delivery window 446 may also be based at least in part on a classification priority of the downstream data 142. In some implementations, the representation system 172 may determine a classification priority that is included in the metadata 176. For example, the preshaped data 174 may indicate that particular packets of downstream data 142 are associated with a higher classification priority and receive expedited processing by the system 100 relative to downstream data 142 that is associated with a lower classification priority. This expedited processing may result in a shorter target delivery window 446 than downstream data 142 with a lower classification priority.

The classification priority may be specified based on one or more of the UT 108, type of the downstream data 142, source of the downstream data 142, quality of service data, and so forth. For example, first downstream data 142(1) addressed to a first UT 108(1) may be given a higher classification priority than second downstream data 142(2) addressed to a second UT 108(2). In another example, the type of the downstream data 142, such as a protocol, service, application, and so forth may be used to determine the classification priority. Continuing the example, downstream data 142 using a transmission control protocol (TCP) may have a different classification priority than downstream data 142 using a user datagram protocol (UDP). In another example, first downstream data 142(1) from a first network address may be given a higher classification priority than second downstream data 142(2) from a second network address. In still another example, quality of service (QoS) data, such as a QoS header value may be used to determine a classification priority.

In one implementation, the preshaped data 174 is indicative of the order in which downstream data 142 is enqueued for sending to a next portion of the system 100. For example, downstream data 142 with a higher classification priority may be enqueued first for transmission from the PoP system 146 to the ground station 106. As a result, the estimated delay to deliver to ground station 448 may be shorter for downstream data 142 with the higher classification priority or other particular attributes that may be indicated by the metadata 176.

As mentioned previously, the target delivery window 446 is an estimate of how long downstream data 142 should be expected to take to reach the UT 108. For comparison, actual delivery delays are shown. For example, the actual delivery delay to ground station 454, the actual delivery delay to satellite 456, and the actual transmission time 458 from the satellite 102 to the UT 108 are shown. In this illustration, the actual delays differ from the estimated delays. This is to be expected due to the uncertainty associated with the communication resources.

FIG. 5 illustrates data associated with operation of the system 100, according to some implementations. The data may include a parameter 502 and an associated value 504.

The target delivery window data 168 may comprise one or more of a start time, estimated ground station delivery time, estimated satellite delivery time, an end time, a duration, or other data. The start time indicates an estimated time at which the downstream data 142 in the preshaped data 174 will begin moving through the system 100. In some implementations the start time may be the time the downstream data 142 was received by the PoP system 146. The estimated ground station delivery time is indicative of an estimated time that the downstream data 142 is expected to be available at the ground station 106. For example, time "E" on the timeline of FIG. 4. The estimated satellite delivery time is indicative of an estimated time that the downstream data 142 is expected to be available at the satellite 102. For example, time "G" on the timeline of FIG. 4. The end time may be the estimated time at which the downstream data 142 is expected to have been delivered to the UT 108. For example, time "J" on the timeline of FIG. 4.

In one implementation, the start time and the end time, or a start time and the duration, may be indicative of the target delivery window 446. In some implementations, the target delivery window data 168 may be indicative of only the end time. For example, the target delivery window 446 may specify a time value that is indicative of a time 402 that the downstream data 142 is expected to be delivered by.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver may be used.

The communication resource data 170 is representative of one or more communication resources associated with delivering the downstream data 142 to the UT 108. For example, the communication resource data 170 may be indicative of a ground station identifier, the targeted timeslot 440, a satellite identifier, one or more uplink resources 442, one or more downlink resources 444, or other data. The ground station identifier is indicative of the next ground station 106 that has been determined to handle the associated downstream data 142. The targeted timeslot 440 indicates the targeted timeslot 440 associated with the downstream data 142, such as determined by the PoP system 146. The satellite identifier indicates the next satellite 102 that has been determined to handle the associated downstream data 142.

The uplink resources 442 may include a ground station uplink modem assignment, uplink timeslot start, uplink timeslot end, and so forth. The downlink resources 444 may include a satellite downlink modem assignment, downlink timeslot start, downlink timeslot end, subbeam identifier indicative of a particular subbeam, and so forth.

The communication resource data 170 may comprise additional information as well. This additional information may be determined by one or more of the PoP system 146, the management system 150, the ground station 106, the satellite 102, and so forth. For example, an intersatellite link (ISL) next satellite ID may specify another satellite 102 that may provide communication services to the UT 108 associated with the downstream data 142. Continuing the example, if the satellite 102 is unable to complete delivery to the UT 108 before the end of the target delivery window 446, the downstream data 142 may be sent to a second satellite 102(2) specified by the ISL next satellite ID. The second satellite 102(2) may then attempt to deliver the downstream data 142.

Figure 6:
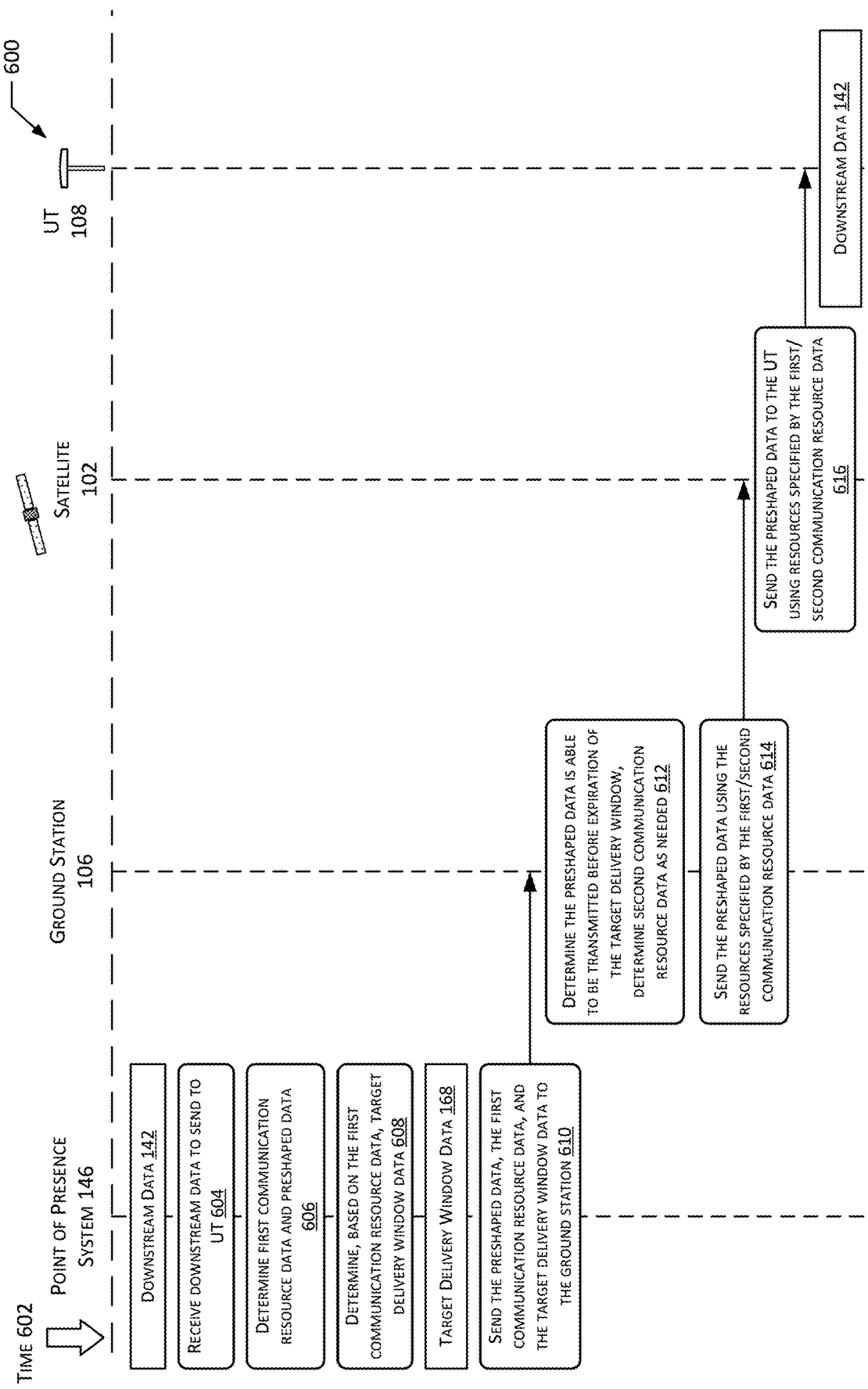
FIG. 6 illustrates a process of managing communication resources to deliver downstream data to the UT within a target delivery window, according to some implementations.

FIG. 6 illustrates a process 600 of managing communication resources to deliver downstream data 142 to the UT 108 within a target delivery window 446, according to some implementations. In this illustration, time 602 generally increases from the top to the bottom of the page. For example, an operation depicted at the top of the page may occur before an operation depicted at the bottom of the page. In this illustration, the PoP system 146, the ground station 106, the satellite 102, and the UT 108 are shown. The other elements of the system, such as the user device 110, are omitted from this illustration for clarity, and not as a limitation.

Operations 604 through 610 may be implemented by one or more of the PoP system 146 or the management system 150.

During operation of the system 100, at 604 the PoP system 146 receives downstream data 142 to be delivered to a UT 108 or associated user device 110. For example, a server on the Internet sends the downstream data 142 to the PoP system 146 comprising a packet with a destination address of the user device 110.

At 606 first communication resource data 170(1) is determined to send the downstream data 142 to the UT 108. For example, the PoP system 146 may use information from the management system 150 to determine which satellites 102 are in range of the UT 108 for the targeted time slot 440, which ground stations 106 are in range of those satellites 102, and so forth. The representation system 172 is then used to determine the preshaped data 174. For example, the representation system 172 may accept as input the first communication resource data 170(1) and the downstream data 142 and determine the preshaped data 174.

At 608, based on the first communication resource data 170(1), target delivery window data 168 is determined. For example, based on system status data 158, information about actual delivery times returned by the satellites 102, historical data, and so forth, the target delivery window 446 is calculated.

At 610 the preshaped data 174, first communication resource data 170(1), and the target delivery window data 168 are sent to the ground station 106. For example, the first communication resource data 170(1) may include a ground station ID that specifies the first ground station 106(1).

The PoP system 146 may prioritize delivery based on the target delivery window 446. For example, the downstream data 142 in the preshaped data 174 may be enqueued for transmission based on the time at which the target delivery window 446 expires. Continuing the example, first downstream data 142(1) that has a first target delivery window 446(1) that expires at a first time may be enqueued for transmission before second downstream data 142(2) that has a second target delivery window 446(2) that expires at a second time after the first time.

Delivery of the preshaped data 174 may also be delayed based on the target delivery window 446. For example, if the target delivery window 446 does not expire for greater than a threshold interval of time, the PoP system 146 may delay sending the downstream data 142. In some implementations, the metadata 176 may specify these delays. These delays may be used to control communication resource usage in subsequent systems. For example, the pacing of the preshaped data 174 may be controlled by the PoP system 146 to delay sending the downstream data 142 to the ground station 106 to control the quantity of data in a buffer at the ground station 106 and avoid buffer exhaustion or buffer overfilling.

Operations 612 through 614 may be implemented by the ground station 106.

At 612 the ground station 106 determines the downstream data 142 in the preshaped data 174 is able to be transmitted before expiration of the target delivery window 446. For example, the ground station 106 may assess the current status of the uplink resources 442 specified by the first communication resource data 170(1). If those uplink resources 442 are deemed to result in delivery of the downstream data 142 before the target delivery window 446 expires, those resources may be used.

The ground station 106 may prioritize delivery based on the target delivery window 446. For example, the downstream data 142 may be enqueued for transmission based on the time at which the target delivery window 446 expires. Continuing the example, first downstream data 142(1) that has a first target delivery window 446(1) that expires at a first time may be enqueued for transmission before second downstream data 142(2) that has a second target delivery window 446(2) that expires at a second time after the first time.

Delivery of the downstream data 142 may also be delayed based on the target delivery window 446. For example, if the target delivery window 446 does not expire for greater than a threshold interval of time, the ground station 106 may delay sending the downstream data 142. These delays may be used to control communication resource usage in subsequent systems. For example, the ground station 106 may delay sending the downstream data 142 to the satellite 102 to aid in managing the quantity of data in a buffer onboard the satellite 102.

However, if the ground station 106 determines that the downstream data 142 will not be delivered to the UT 108 before the target delivery window 446 expires, the ground station 106 determines second communication resource data 170(2) indicative of different communication resources. For example, the second communication resource data 170(2) may specify a different uplink modem or other resource.

At 614 the preshaped data 174 including the downstream data 142 is sent to the satellite 102 using the communication resources specified by the first communication resource data 170(1) or second communication resource data 170(2). In some implementations, one or more of the communication resource data 170 or the target delivery window data 168 may be sent to the satellite 102.

Operation 616 may be implemented by the satellite 102. At 616 the satellite 102 sends the downstream data 142 to the UT 108 using the communication resources specified by the first/second communication resource data 170 sent by the ground station 106. In some implementations, the satellite 102 may determine if third communication resource data 170(3) is needed. For example, the satellite 102 may assess the current status of the downlink resources 444 specified by the second communication resource data 170(2). If those downlink resources 444 are deemed to result in delivery of the downstream data 142 before the target delivery window 446 expires, those resources may be used. Otherwise, the third communication resource data 170(3) may be determined.

The satellite 102 may prioritize delivery based on the target delivery window 446. For example, the downstream data 142 may be enqueued for transmission based on the time at which the target delivery window 446 expires. Continuing the example, first downstream data 142(1) that has a first target delivery window 446(1) that expires at a first time may be enqueued for transmission before second downstream data 142(2) that has a second target delivery window 446(2) that expires at a second time after the first time. In some implementations, the prioritization of delivery may be specified by the metadata 176. For example, the metadata 176 may indicate the order in which packets of the downstream data 142 are to be delivered.

Delivery of the downstream data 142 may also be delayed based on the target delivery window 446. For example, if the target delivery window 446 does not expire for greater than a threshold interval of time, the satellite 102 may delay sending the downstream data 142 to the UT 108. These delays may also be used to control communication resource usage in subsequent systems. For example, the metadata 176 may be used to pace the delivery of the downstream data 142 delaying delivery of some packets of downstream data 142.

The satellite 102 may send data indicative of one or more delays to one or more of the ground station 106, the PoP system 146, the management system 150, and so forth. For example, the satellite 102 may determine a queuing delay between when the satellite 102 receives the downstream data 142 and transmission of the downstream data 142 to the first UT 108 begins. In another example, the satellite 102 may determine an actual delay between when the satellite 102 receives the downstream data 142 and transmission of the downstream data 142 to the first UT 108 is complete. The queuing delay, the actual delay, or other information may be sent to one or more of the ground station 106, the PoP system 146, the management system 150, and so forth.

By providing preshaped data 174 to the satellite 102, the resources used by the satellite 102 to perform traffic shaping may be substantially reduced or eliminated. For example, the satellite 102 may use the preshaped data 174 without further traffic shaping. In another example, changing conditions may result in the preshaped data 174 being reshaped onboard the satellite 102 prior to sending. However, even if additional shaping does take place onboard the satellite 102, the resources used for reshaping are reduced by using the preshaped data 174 as input. For example, the traffic reshaping techniques performed onboard the satellite 102 may be reduced to changes in pacing and slight reordering, as the preshaped data 174 has already been aggregated and reordered.

The UT 108 receives the downstream data 142. The UT 108 may subsequently send the downstream data 142 to the user device 110. For example, the UT 108 may use a local area network to send the downstream data 142 to the user device 110.

Figure 7:
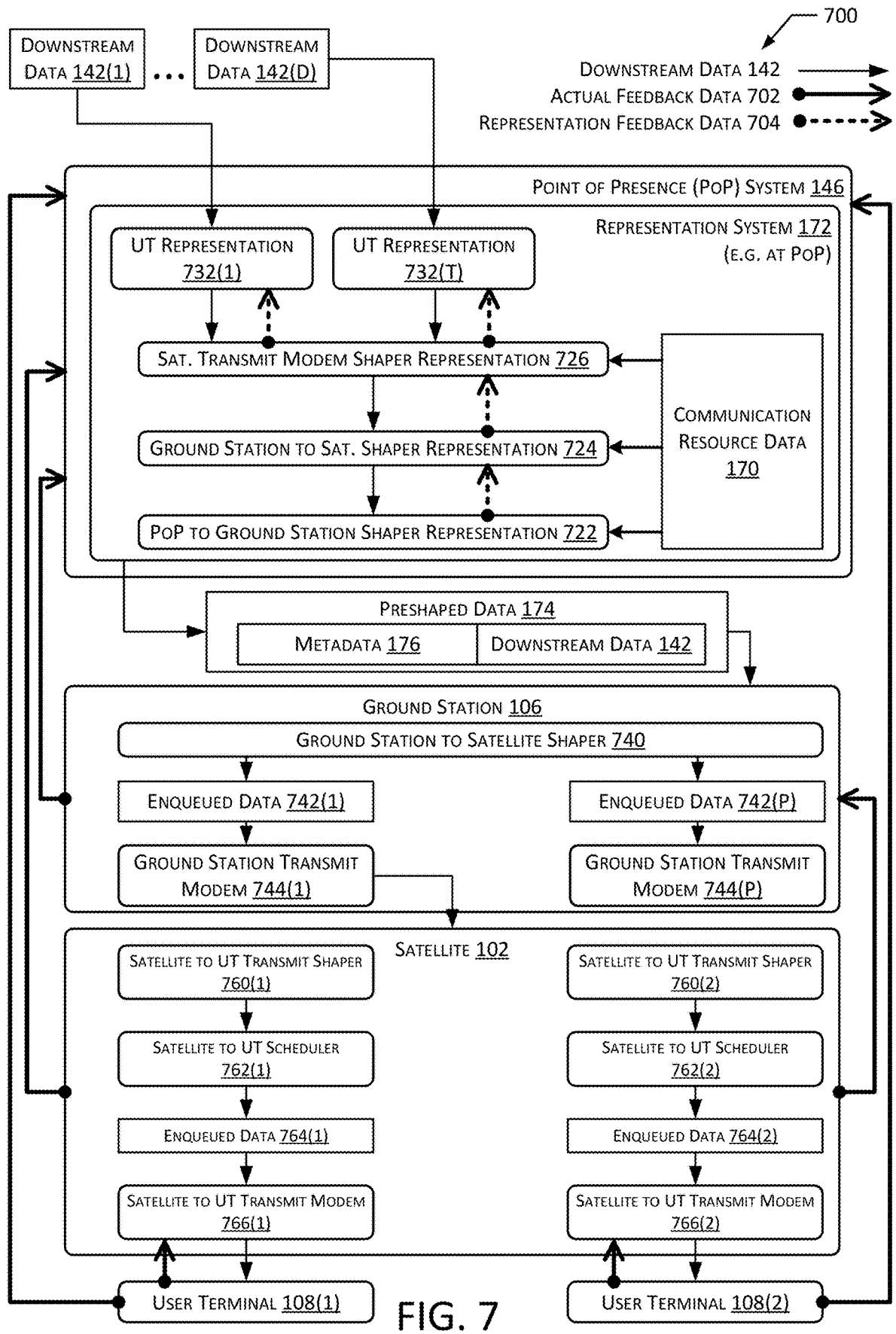
FIG. 7 illustrates a block diagram of a representation system to determine preshaped data, according to some implementations.

FIG. 7 illustrates a block diagram 700 of a representation system 172 to determine preshaped data 174, according to some implementations. The representation system 172 may comprise instructions executing on one or more computing devices that provide a representation of one or more communication resources of the system 100. The representation system 172 may accept as input downstream data 142(1), 142(2), . . . , 142(D) that is addressed to one or more user terminals 108(1), 108(2), . . . , 108(T). The representation system 172 may also accept as input the communication resource data 170 associated with the delivery of the downstream data 142, such as determined by the PoP system 146.

The traffic shapers, representation or actual, may implement one or more traffic shaping techniques. These traffic shaping techniques may include, but are not limited to, aggregating downstream data 142, reordering downstream data 142 to specify a transmission order, transmission pacing of the downstream data 142 to control when data is transmitted, and so forth. Aggregation may comprise combining two or more packets of data to form a single packet. Reordering may change the sequence in which packets are to be delivered and specify a particular transmission order. For example, packets that are time sensitive may be delivered before packets that are not. Transmission pacing involves asserting control as to when packets are sent. For example, pacing data may indicate that a minimum interval of time must elapse between sending a first packet and sending a second packet.

In some implementations, the traffic shapers, representation or actual, may utilize payload data associated with downstream data 142. For example, deep packet inspection may be used by a traffic shaper to determine whether to aggregate, reorder, pace, or any combination thereof, one or more packets.

The system 100 may also implement one or more traffic management systems using one or more traffic management techniques. For example, one or more policies may be used to assess and control delivery or discard of at least a portion of the downstream data 142. The policy implemented by the traffic management system may specify one or more of selectively discarding, delaying, rerouting, and so forth some downstream data 142. Continuing the example, the policies may specify limits such as maximum throughput to a specified UT 108, maximum throughput from a specified source of upstream data 142 that is accepted at a PoP system 146, and so forth. The traffic management system may be implemented in the actual system. For example, a traffic management system may process incoming downstream data 142 before that downstream data 142 is passed to the representation system 172. In another implementation, the representation system 172 may include a representation of a traffic management system.

The representation system 172 may represent the communication resources that are specified as being within a particular scope of operation of the system 100 downstream of the representation system 172. For example, the representation system 172 may be representative of the communication resources that are operating in coordination with a particular PoP system 146 at a particular time or during a specified time interval. This may include a PoP to ground station shaper representation 722, a ground station to satellite shaper representation 724, a satellite transmit modem shaper representation 726, a UT representation 732, and so forth.

In one implementation, the representation system 172 may consider the downstream data 142 in an order that is opposite that of actual flow of downstream data 142 through the actual communication resources. For example, the representation system 172 may begin with considering the downstream data 142 as present at a representation of the UT 108. The representation system 172 may then operate in reverse fashion, determining how the downstream data 142 should be shaped to produce the desired result of the downstream data 142 at the UT 108. For example, given the delivery of the downstream data 142 to the UT representation 732 within the target delivery window 446, the representation system 172 determines how the downstream data 142 should be shaped to produce that outcome. The representation system 172 may comprise one or more user terminal representations 732(1), . . . , 732(T). A user terminal representation 732 may be instantiated for each UT 108 that is downstream of the representation system 172. For example, a user terminal representation 732 may be instantiated for each UT 108 that is serviced by the first PoP system 146. The downstream data 142 may be provided to the UT representation 732 during operation of the representation system 172.

The user terminal representation 732 may replicate the responses of the UT 108 given a particular starting state, set of inputs, and so forth. The user terminal representation 732 may be configured or operate as if configured as the actual UT 108 is configured. For example, the user terminal representation 732 may include representation buffers that are representative of actual buffers on the UT 108. Parameters associated with the UT 108 may be specified for the user terminal representation 732 it represents. For example, a peak information rate (PIR) may be specified that indicates a maximum rate at which downstream data 142 is to be provided to the user terminal representation 732. In one implementation, the PIR may be based on a lesser value of: a predicted or known data transmission rate associated with the modulation and coding that is expected to be used, or a maximum committed information rate that indicates a maximum rate at which data is to be provided. Downstream data 142 that exceeds these rates may be buffered for a specified interval of time, and may be selectively discarded as needed. The expected modulation and coding to be used may be provided by one or more of the management system 150, the PoP system 146, the satellite 102, and so forth. For example, the communication resource data 170 may specify an expected modulation and coding to be used.

The user terminal representation 732 may receive, or be operated based on, one or more of the actual feedback data 702 or representation feedback data 704. The actual feedback data 702 may result in modified operation of a representation in the representation system 172. For example, changes in modulation and coding that occur at the actual satellite to UT transmit modem 766 may be used to adjust behavior of the representation system 172. In another example, the UT representation 732 may receive representation feedback data 704 that is indicative of predicted backpressure at the satellite transmit modem shaper representation 726. The user terminal representation 732 may include representation buffers that are representative of actual buffers on the UT 108. Data indicative of buffer fill or buffer drain rates may be used to represent the responses of the user terminal representation 732. This data may be based on projected or actual historical values.

The satellite transmit modem shaper representation 726 may be instantiated for each satellite to UT transmit modem 766 associated with the satellite 102. The satellite transmit modem shaper representation 726 may comprise a representation of the satellite to UT transmit modem 766 used to send data from the satellite 102 to the UT 108. The satellite transmit modem shaper representation 726 receives data from the UT representation 732 regarding the downstream data 142. Responsive to this, the satellite transmit modem shaper representation 726 may apply one or more traffic shaping techniques to provide the downstream data 142 to the UT representation 732. For example, the satellite transmit modem shaper representation 726 may take into consideration data indicative of buffer fill or buffer drain rates associated with operation of the satellite to UT transmit shaper 760. This data may be based on projected or actual historical values.

The ground station to satellite shaper representation 724 may be instantiated for each ground station transmit modem 744 associated with the ground station 106. The ground station to satellite shaper representation 724 may comprise a representation of the ground station transmit modem 744 used to send data from the ground station 106 to the satellite 102. The ground station to satellite shaper representation 724 receives data from the satellite transmit modem shaper representation(s) 726 regarding the downstream data 142. Responsive to this, the ground station to satellite shaper representation 724 may apply one or more traffic shaping techniques to provide the downstream data 142 to the satellite transmit modem shaper representation 726. The ground station to satellite shaper representation 724 may take into consideration data indicative of buffer fill or buffer drain rates of the ground station transmit modem 744. This data may be based on projected or actual historical values.

The PoP to ground station shaper representation 722 may be instantiated for each ground station 106 that is associated with the representation system 172. The PoP to ground station shaper representation 722 receives data from the ground station to satellite shaper representation(s) 724 regarding the downstream data 142. The PoP to ground station shaper representation 722 may apply one or more traffic shaping techniques to the downstream data 142 to provide the downstream data 142 to the ground station to satellite shaper representation(s) 724. The PoP to ground station shaper representation 722 may take into consideration data indicative of data transfer between the PoP system 146 and the ground station 106. This data may be based on projected or actual historical values.

During operation of the representation system 172, representation feedback data 704 may be exchanged between the representation elements of the representation system 172. The representation feedback data 704 may be used to determine the preshaped data 174. For example, the PoP to ground station shaper representation 722 may send representation feedback data 704(1) to the ground station to satellite shaper representation 724. Responsive to the representation feedback data 704(1), the ground station to satellite shaper representation 724 may adjust pacing to prevent its buffer from being overloaded.

In some implementations, as the downstream data 142 is processed by the representation system 172, the handling of the downstream data 142 may be evaluated to determine one or more traffic shaping techniques that optimize performance of the representation system 172. These traffic shaping techniques may then be applied to the downstream data 142 to determine the preshaped data 174 comprising the downstream data 142 and metadata 176. The downstream data 142 included in the preshaped data 174 may be aggregated, reordered, paced, and so forth In another implementation, the representation system 172 may consider the downstream data 142 in an order that is consistent with the actual flow of downstream data 142 through the actual communication resources. For example, the downstream data 142 may be processed by the PoP to ground station shaper representation 722, then processed by the ground station to satellite shaper representation 724, then processed by the satellite transmit modem shaper representation 726. In this implementation, different shaping conditions may be evaluated to determine the preshaped data 174. Shaping conditions that meet one or more criteria, such as maximizing overall throughput to the UT representation 732, then be selected for subsequent use in determining the preshaped data 174.

The preshaped data 174 may comprise the output from the respective representation elements, to correspond to movement through the actual system 100. This is depicted with regards to FIGS. 8 and 9. By determining the preshaped data 174, the subsequent actual communication resources may avoid or experience reduced need for traffic shaping.

As shown in FIG. 7, the preshaped data 174 is provided to a corresponding ground station 106. The ground station 106 includes a ground station to satellite shaper 740 that may apply one or more traffic shaping techniques to incoming data and produce enqueued data 742. The enqueued data 742 may then be provided to a ground station transmit modem 744 for transmission. The ground station transmit modem 744 may be used to send the enqueued data 742 to the satellite 102. Because the preshaped data 174 has been previously shaped based on the representation system's 172 estimated operation of the ground station 106, the ground station to satellite shaper 740 may perform no additional shaping. For example, the enqueued data 742 may comprise a subset of the preshaped data 174 that is associated with a particular ground station transmit modem 744.

In some implementations the ground station to satellite shaper 740 may be omitted from the ground station 106, and the preshaped data 174 may be used directly. For example, the metadata 176 may indicate the particular ground station transmit modem 744 that is to be used to send a packet of downstream data 142, and the preshaped data 174 may require no further shaping prior to transmission.

The actual performance of the ground station 106 or elements therein, such as a ground station transmit modem 744, may deviate from those expected by the representation system 172 in some circumstances. For example, due to changes in weather, equipment availability, or other factors, the ground station 106 may change the communication resources used to deliver the preshaped data 174. In one implementation, the second communication resource data 170(2) may be compared to actual communication resources used to determine a difference. If the difference exceeds a threshold, the ground station to satellite shaper 740 may apply traffic shaping techniques to the preshaped data 174 to produce the enqueued data 742. For example, if a ground station transmit modem 744 decreases throughput due to a change in modulation and coding resulting from weather effects, the preshaped data 174 may be reshaped to produce the enqueued data 742. If the difference does not exceed a threshold, the ground station to satellite shaper 740 may use at least a subset of the preshaped data 174 without change.

The ground station transmit modem 744 sends the enqueued data 742 to the associated satellite 102. A receiver and receive modem on the satellite 102 receives the enqueued data 742 that comprises the preshaped data 174. A satellite to UT transmit shaper 760 processes this incoming downstream data 142 to perform any additional traffic shaping before transmission to the associated UT 108. A satellite to UT scheduler ("scheduler") 762 accepts the output from the satellite to UT transmit shaper 760 and schedules the downstream data 142 for transmission to the associated UT 108 as the enqueued data 764. For example, the satellite to UT scheduler 762 may operate to maximize the amount of data transmitted per frame. The enqueued data 764 may be enqueued in the time domain, frequency domain, or time and frequency domain. The scheduler 762 may accept the preshaped data 174 and may modify the ordering of packets for transmission. Continuing the example, the scheduler 762 may add packets in the preshaped data 174 to a frame in the enqueued data 764 for transmission. A packet that causes the size of the frame in the enqueued data 764 to exceed a threshold value may be delayed until a next opportunity for transmission. Continuing the example, a smaller packet that fits within the remaining size of the frame may be included in the frame and subsequently in the enqueued data 764, resulting in packets 804 being transmitted in an order that differs from that provided by the preshaped data 174.

In some implementations the satellite to UT scheduler 762 may take into account the target delivery window 446 or other data indicative of timing. For example, the satellite to UT scheduler 762 may prioritize queuing of packets that have been previously delayed or are at risk of being delivered outside the target delivery window 446, so that those packets are delivered first.

The enqueued data 764, and the frames containing packets therein, may then be provided as input to the satellite to UT transmit modem 766. The satellite to UT transmit modem 766 may be used to send the enqueued data 764.

Because the preshaped data 174 has been previously shaped based on the representation system's 172 estimated operation of the ground station 106, the satellite to UT transmit shaper 760 may perform no additional shaping. For example, the enqueued data 764 may comprise a subset of the preshaped data 174 that is associated with a satellite to UT transmit modem 766.

In some implementations the satellite to UT transmit shaper 760 may be omitted from the satellite 102, and the preshaped data 174 may be used directly. For example, the metadata 176 may indicate the particular satellite to UT transmit modem 766 that is to be used to send a packet of downstream data 142, and the preshaped data 174 may require no further shaping prior to transmission.

The actual performance of the satellite 102 or elements therein, such as a satellite to UT transmit modem 766, intersatellite links 190, and so forth, may deviate from those expected by the representation system 172 in some circumstances. For example, due to changes in weather, equipment availability, or other factors, the satellite 102 may change the communication resources used to deliver the preshaped data 174. In one implementation, the third communication resource data 170(3) may be compared to actual communication resources used to determine a difference. If the difference exceeds a threshold, the satellite to UT transmit shaper 760 may apply traffic shaping techniques to the preshaped data 174 to produce the enqueued data 764. For example, if the satellite to UT transmit modem 766 decreases throughput due to a change in modulation and coding resulting from weather effects, the preshaped data 174 may be reshaped to produce the enqueued data 764. If the difference does not exceed a threshold, the satellite to UT transmit shaper 760 may use at least a subset of the preshaped data 174 or the enqueued data 742 without change.

The satellite to UT transmit modem 766 sends the enqueued data 764 to the UT 108. The UT 108 receives the data and may use or provide the corresponding downstream data 142 to the respective user device(s) 110.

During operation, actual feedback data 702 may be exchanged between communication resources of the system 100. For example, one or more of the user terminal 108, the satellite 102, the ground station 106, or elements thereof may provide actual feedback data 702 to the representation system 172. The actual feedback data 702 may include information including, but not limited to buffer fill rates, buffer drain rates, data throughput values, flow control messages, and so forth. In some implementations the actual feedback data 702 may comprise state data associated with a communication resource.

The representation system 172 may use the actual feedback data 702 or other data to modify operation of the corresponding representations. In one implementation, the satellite 102 may send actual feedback data 702 to the representation system 172. For example, the satellite to UT transmit modem 766 may send actual feedback data 702 indicating that the buffer drain rate of the satellite to UT transmit modem 766 is less than the buffer fill rate, indicating the satellite to UT transmit modem 766 is unable to send data quickly enough to keep up with the incoming data from the ground station 106 that is scheduled to use that satellite to UT transmit modem 766. The actual feedback data 702 may be provided to one or more of the satellite transmit modem shaper representation 726 or other portions of the representation system 172. Responsive to this, the representation system 172 may modify operation to change the traffic shaping applied to the downstream data 142 that is used to determine subsequent preshaped data 174. For example, the pacing of downstream data 142 that is allocated to be sent by the satellite to UT transmit modem 766 may be changed.

The size of the buffer used by the satellite to UT transmit modem 766 may be determined based on one or more of the round trip time between the satellite 102 and the representation system 172. For example, the buffer may have sufficient capacity to store downstream data 142 until later received preshaped data 174 may be determined by the representation system 172 and subsequently delivered to the satellite to UT transmit shaper 760.

In another implementation, the ground station 106 may send actual feedback data 702 to the representation system 172. For example, actual feedback data 702 indicating that the buffer drain rate of the ground station transmit modem 744 is less than the buffer fill rate, indicating the ground station transmit modem 744 is unable to send data quickly enough to keep up with the incoming data from the PoP system 146, may be provided to the ground station to satellite shaper representation 724. The actual feedback data 702 may be provided to one or more of the ground station to satellite shaper representation 724 or other portions of the representation system 172. Responsive to this, the representation system 172 may change the traffic shaping applied to the downstream data 142 that is used to determine subsequent preshaped data 174.

In another implementation, the UT 108 may send actual feedback data 702 to the representation system 172. For example, the UT 108(1) may send a message indicating that it is going offline, in which case the corresponding UT representation 732(1) may be designated as offline as well. As a result, the representation system 172 would reject further processing of traffic addressed to the UT 108(1), preventing the system 100 from transmitting downstream data 142 that would be undeliverable to the offline UT 108(1).

During operation, the actual feedback data 702 and the representation feedback data 704 may be relatively minimal. For example, because the representation system 172 is processing the downstream data 142 in reverse order beginning with the UT representation 732, representation feedback data 704 may be minimal to nonexistent. Likewise, the actual feedback data 702 may be minimal, typically resulting from changes that are not predictable, such as modulation and coding changes due to weather effects, unexpected hardware failure, and so forth.

In one implementation, the first PoP system 146 may receive first data such as downstream data 142(1) comprising a first plurality of packets 804 having a first destination address associated with the first UT 108(1). The first PoP system 146 may receive second data such as downstream data 142(2) comprising a second plurality of packets 804 having a second destination address associated with the second UT 108(2). The first PoP system 146 may determine third data indicative of communication resources, such as first communication resource data 170(1). The first communication resource data 170(1) may be associated with the communication resources expected to be used to deliver the first data to the first UT 108(1) and deliver the second data to the second UT 108(2). The third data may be indicative of a first modem at the first ground station 106, such as the ground station transmit modem 744, a second modem at the first satellite 102(1) and a third modem at the first satellite 102(1). For example, the second modem may comprise the satellite to UT transmit modem 766(1) and the third modem may comprise the satellite to UT transmit modem 766(2).

Fourth data is determined, such as the preshaped data 174, based on a representation of operation of the first modem, the second modem, and the third modem, as indicated by the third data. For example, the representation of operation may comprise the representation system 172. The fourth data may comprise one or more of: the first data, or the second data. For example, the preshaped data 174 may comprise the downstream data 142 that has been processed using one or more traffic shaping techniques.

The traffic shaping techniques may include one or more of: aggregating two or more packets of the first plurality of packets, aggregating two or more packets of the second plurality of packets, aggregating a first packet of the first plurality of packets and a second packet of the second plurality of packets, determining a first transmission order of the first plurality of packets, determining a second transmission order of the second plurality of packets, determining a third transmission order of a combination of the first plurality of packets and the second plurality of packets, determining a first transmission pacing of the first plurality of packets, determining a second transmission pacing of the second plurality of packets, or determining a third transmission pacing of a combination of the first plurality of packets and the second plurality of packets.

One or more of the header data or the payload data of packets may be used to determine the preshaped data 174. For example, the fourth data may be based on one or more of: first header data associated with individual ones of the first plurality of packets, first payload data associated with individual ones of the first plurality of packets, second header data associated with individual ones of the second plurality of packets, or second payload data associated with individual ones of the second plurality of packets.

The fourth data may be further based on one or more of: a first representation of a traffic shaper operating at the ground station 106 such as the ground station to satellite shaper representation 724, a first actual traffic shaper operating at the ground station 106 such as the ground station to satellite shaper 740, a second representation of a traffic shaper operating at the first satellite 102 such as the satellite transmit modem shaper representation 726, or a second actual traffic shaper operating at the first satellite 102 such as the satellite to UT transmit shaper 760.

As mentioned above, the representation system 172 may be responsive to representation feedback data 704. The representation feedback data 704 comprises information indicative of estimated backpressure from a representation in the representation system 172. For example, the fourth data is further based on one or more of: fifth data indicative of estimated backpressure from the first modem, or sixth data indicative of estimated backpressure from the second modem.

The third data and the fourth data are sent to the first ground station 106. Continuing this implementation, the first ground station 106 receives the third data and the fourth data. Based at least in part on the third data, the first ground station 106 sends the fourth data and at least a portion of the third data to the first satellite 102(1) using the first modem. For example, the enqueued data 742 is sent to the satellite 102 using the ground station transmit modem 744.

As discussed above, additional traffic shaping may be performed as conditions change. For example, the first ground station 106 may determine congestion associated with use of the first modem, such as the ground station transmit modem 744, is greater than a threshold value. Continuing the example, the threshold value may be based on a buffer drain rate and a buffer fill rate. For example, the threshold value may comprise a value that is compared to a quotient of the buffer drain rate and the buffer fill rate. The buffer drain rate is indicative of a rate at which a buffer of the ground station transmit modem 744 is emptying. The buffer fill rate is indicative of a rate at which data is being added to the buffer for transmission. Continuing the example, if the buffer drain rate is less than the buffer fill rate, the ground station transmit modem 744 may be deemed to be in a congestion state. In other implementations, other metrics or analyses may be performed to determine congestion. For example, congestion may be determined if data throughput drops below a threshold value. Responsive to this, one or more traffic shaping techniques may be applied to the fourth data before the fourth data is sent to the first modem.

Continuing this implementation, the first satellite 102(1) receives the fourth data and the at least a portion of the third data. The first satellite 102(1) then sends, based at least in part on the at least a portion of the third data, the first data to the first UT 108(1) using the second modem and the second data to the second UT 108(2) using the third modem.

As discussed above, additional traffic shaping may be performed as conditions change. For example, the first satellite 102(1) may determine congestion associated with use of the second modem, such as the satellite to UT transmit modem 766(1), is greater than a threshold value. For example, if a buffer drain rate of a buffer associated with the satellite to UT transmit modem 766 is less than a buffer fill rate, the satellite to UT transmit modem 766 may be deemed to be congested. Responsive to this, one or more traffic shaping techniques may be applied to the fourth data before the fourth data is sent to the second modem.

The architecture depicted with regard to FIG. 7 is illustrative, and not provided necessarily as a limitation. Other architectures in which various elements are combined, distributed, duplicated, and so forth are possible. For example, the functionality of the ground station to satellite shaper representation 724 and the PoP to ground station shaper representation 722 may be combined into a single element. In another example, each UT representation 732 may be associated with an individual satellite transmit modem shaper representation 726. In yet another example, the satellite 102 may omit the satellite to UT transmit shaper 760.

In some implementations, a plurality of representation systems 172 may interact. For example, a first representation system 172(1) at the first PoP system 146(1) may be assigned a first portion of uplink capacity to the first satellite 102(1) while a second representation system 172(1) at a second PoP system 146(2) is assigned a second portion of the uplink capacity to the first satellite 102(1). The two representation systems 172(1) and 172(2) may coordinate their operation so that combined downstream data 142 from both that is sent to the ground station 106 for delivery to the first satellite 102(1) does not exceed the available capacity of the uplink.

Figure 8:
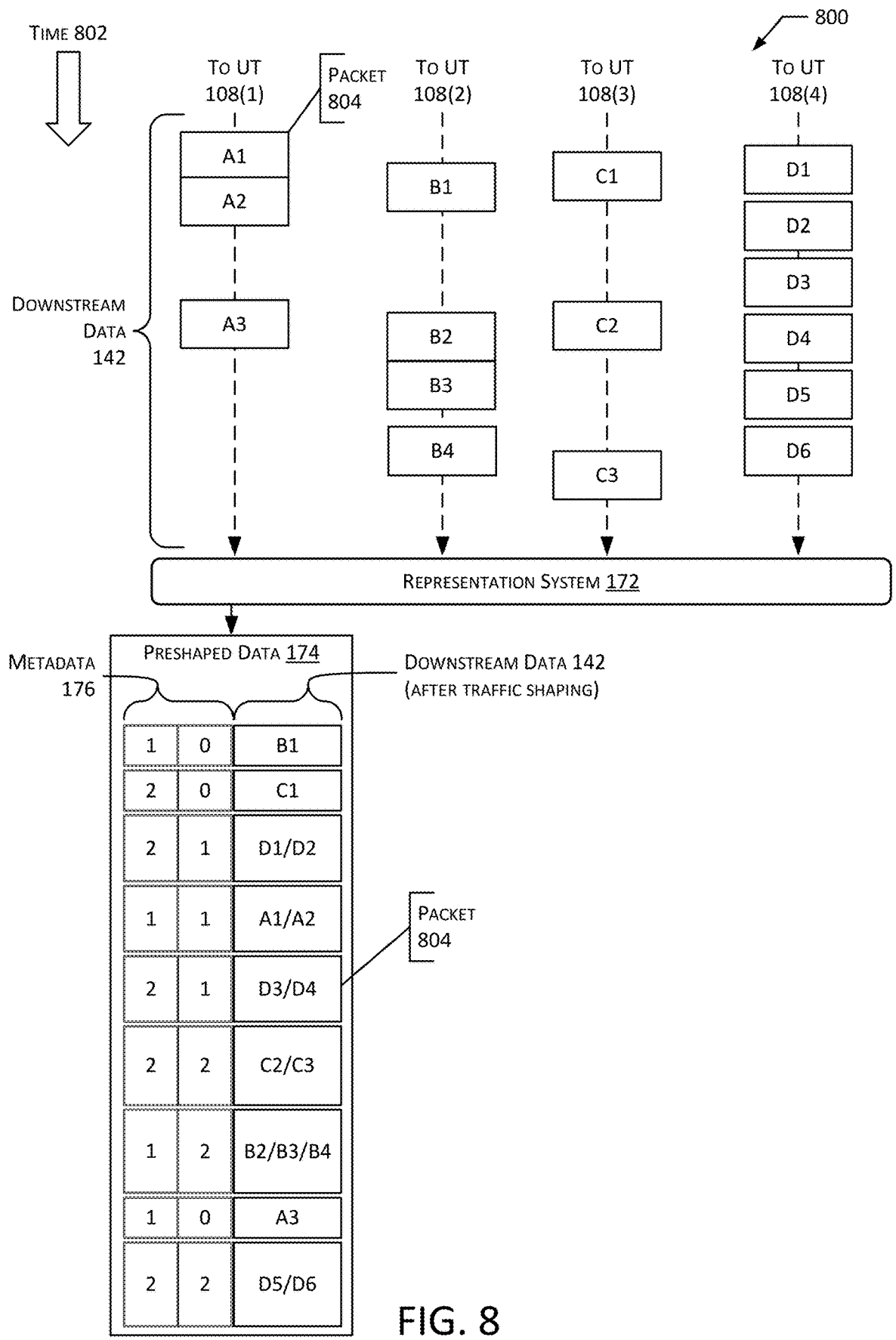
FIG. 8 illustrates preshaped data determined by a representation system, according to some implementations.

FIG. 8 illustrates preshaped data 174 determined by a representation system 172, according to some implementations. In this figure, time 802 increases down the page.

Downstream data 142 is received over time at a first PoP system 146 and is processed by the representation system 172. In this illustration, downstream data 142 that is addressed to four UT's 108(1), 108(2), 108(3), and 108(4) are shown. Four UTs 108 are shown by way of illustration, and not necessarily as a limitation. For example, the system 100 may support millions of UTs 108 during operation. The downstream data 142 may comprise a first plurality of packets having a first destination address associated with the first UT 108(1), a second plurality of packets having a second destination address associated with the second UT 108(2), and so forth.

The downstream data 142 may comprise packets 804, with each packet 804 represented as a box labeled "A1, A2, . . . , B1, B2, . . . , C1, C2, . . . , D1, D2, . . . " and so forth. Packets 804 having a prefix beginning with "A" are addressed to the first UT 108(1), packets 804 having a prefix beginning with "B" are addressed to the second UT 108(2), packets 804 having a prefix beginning with "C" are addressed to the third UT 108(3), and packets 804 having a prefix beginning with "D" are addressed to the fourth UT 108(4). The packets 804 are received at various times. Packets 804 are depicted by way of illustration, and not necessarily as a limitation. In other implementations, the system 100 may use data transfer units other than packets 804. The downstream data 142 is processed by the representation system 172 to produce preshaped data 174.

The preshaped data 174 comprises the downstream data 142 after any modifications resulting from traffic shaping, and may include the metadata 176. In comparing the preshaped data 174 depicted to the downstream data 142 depicted, packets 804 have been placed in an order that differs from the order in which they were received at the representation system 172. Some packets 804 in the preshaped data 174 are the result of aggregation of two or more packets 804. For example, packet 804 "D3/D4" is an aggregation of packets 804 "D3" and "D4".

The metadata 176 in this illustration is shown associated with individual packets 804. In other implementations, metadata 176 may be associated with a set or group of packets 804, such as packets in a same flow. The metadata 176 shown here includes a first column indicative of a particular satellite to UT transmit modem 766 that is to be used for sending the associated packet 804. For example, a value of "1" indicates use of satellite to UT transmit modem 766(1) while a value of "2" indicates use of satellite to UT transmit modem 766(2). The metadata 176 shown here includes a second column indicative of a particular pacing or delay between packets 804. For example, a value of 0 may indicate no delay, while a value of "1" indicates introducing a one millisecond pacing delay in the transmission of that packet 804 relative to completion of the packet 804 that is either sent before or after. In other implementations the metadata 176 may include data indicative of priority, expiration time, and so forth.

Figure 9:
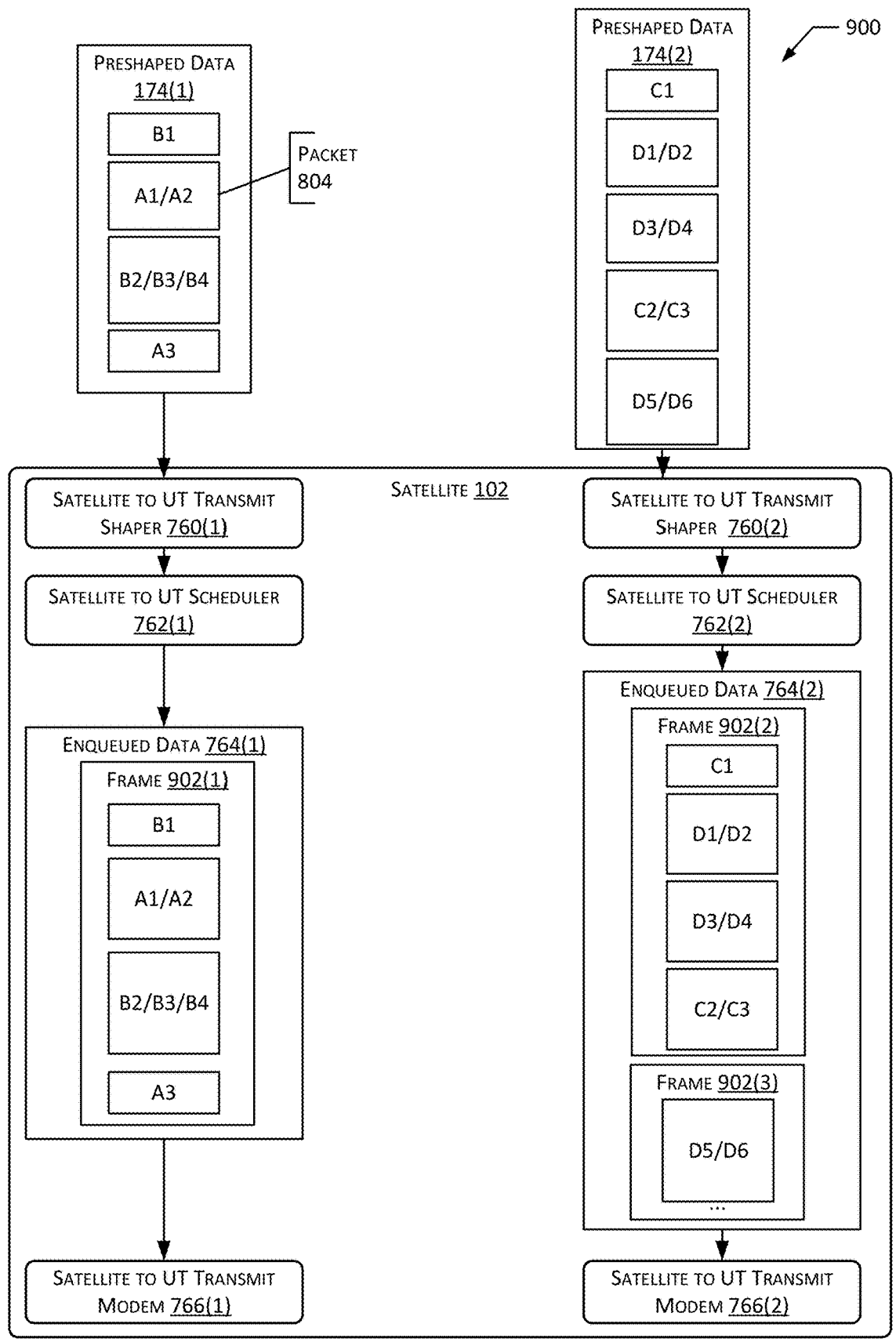
FIG. 9 illustrates preshaped data used by a satellite, according to some implementations.

FIG. 9 illustrates at 900 the preshaped data 174 being used by a satellite 102, according to some implementations. In this illustration, the satellite 102 has received the preshaped data 174 as sent from the ground station 106. That preshaped data 174 comprises first preshaped data 174(1) that is associated with the first satellite to UT transmit modem 766(1) and second preshaped data 174(2) that is associated with the second satellite to UT transmit modem 766(2). For example, the preshaped data 174 may be received by the satellite 102 and may be divided into sets of preshaped data 174, based on the metadata 176. Continuing the example, the first preshaped data 174(1) and the second preshaped data 174(2) may be distinguished by the metadata 176 that is indicative of the satellite to UT transmit modem 766 to be used. Each set of preshaped data 174 is processed by the respective systems onboard the satellite 102. For example, the first preshaped data 174(1) is sent to the satellite to UT transmit shaper 760(1), while the second preshaped data 174(2) is sent to the satellite to UT transmit shaper 760(2), and so forth.

In some implementations the metadata 176 may include alternative shaping data. The alternative shaping data may be indicative of, but is not limited to, an alternative ordering of packets 804, designation of packets 804 that may be dropped, alternative pacing values, and so forth. For example, in the event throughput of a given satellite to UT transmit modem 766 drops below a threshold value, an alternative ordering of packets 804 may be specified and some packets 804 that have been predesignated may be dropped. By providing the alternative shaping data, the satellite 102 is able to quickly respond to changes that may not be anticipated without substantial onboard processing.

The preshaped data 174 minimizes the processing performed by the satellite 102, eliminating or significantly reducing performance of traffic shaping onboard the satellite 102 that would otherwise require compute resources such as processors, memory, consume electrical power, and introduce delay.

The satellite to UT scheduler 762 processes the output from the satellite to UT transmit shaper 760 to determine the enqueued data 764. The satellite to UT scheduler 762 may arrange packets 804 into frames 902 to maximize the amount of data transmitted in a frame 902. These frames 902 may then be stored as the enqueued data 764 for transmit using the satellite to UT transmit modem 766.

In implementations where the satellite to UT transmit shaper 760 is omitted, the satellite to UT scheduler 762 may use the preshaped data 174 as input.

In this illustration, the satellite to UT transmit shaper 760 performs no reshaping on the preshaped data 174 as received, and the satellite to UT scheduler 762 has not changed the order of the packets 804. For example, packet 804 "B1" is enqueued in the enqueued data 764(1) for transmission by the satellite to UT transmit modem 766(1) before packet 804 "A1/A2". In comparison, packet 804 "C2/C3" is enqueued in the enqueued data 764(2) for transmission by the satellite to UT transmit modem 766(2) after packet 804 "D3/D4".

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first point-of-presence (PoP) system;
a first ground station that is in communication with the first PoP system;
a first satellite that is in communication with the first ground station;
a first user terminal (UT) that is in communication with the first satellite;
a second user terminal (UT) that is in communication with the first satellite;
the first PoP system to:
receive first data comprising a first plurality of data packets having a first destination address associated with the first UT;
receive second data comprising a second plurality of data packets having a second destination address associated with the second UT;
determine third data indicative of communication resources associated with:
delivery of the first data to the first UT, and
delivery of the second data to the second UT,
wherein the third data is indicative of a first modem at the first ground station, a second modem at the first satellite, and a third modem at the first satellite;
determine fourth data based on a representation of operation of the first UT, the second UT, the first modem, the second modem, and the third modem, wherein the fourth data comprises one or more of:
the first data, or
the second data; and
send the third data and the fourth data to the first ground station;
the first ground station to send the fourth data and at least a portion of the third data to the first satellite; and
the first satellite to send the first data to the first UT using the second modem and the second data to the second UT using the third modem.

2. The system of claim 1, wherein the representation of operation:
receives the first data at a first UT representation;
determines one or more traffic shaping techniques to apply to the first data to send the first data from a representation of the second modem to the first UT representation; and
determines one or more traffic shaping techniques to apply to the second data to send the second data from a representation of the third modem to the first UT representation.

3. The system of claim 1, wherein the representation of operation:
receives the first data at a first UT representation;
receives the second data at a second UT representation; and
determines one or more traffic shaping techniques to apply to the first data and the second data to send the first data and the second data using a representation of the first modem, a representation of the second modem, and a representation of the third modem.

4. The system of claim 1, wherein to determine the fourth data, the first PoP system is further to one or more of:
aggregate two or more data packets of the first plurality of data packets,
aggregate two or more data packets of the second plurality of data packets, aggregate a first data packet of the first plurality of data packets and a second data packet of the second plurality of data packets, determine a first transmission order of the first plurality of data packets, determine a second transmission order of the second plurality of data packets, determine a third transmission order of a combination of the first plurality of data packets and the second plurality of data packets, determine a first transmission pacing of the first plurality of data packets, determine a second transmission pacing of the second plurality of data packets, or determine a third transmission pacing of a combination of the first plurality of data packets and the second plurality of data packets.

5. The system of claim 1, wherein the first PoP system determines the fourth data based on one or more of:

first header data associated with individual ones of the first plurality of data packets, first payload data associated with individual ones of the first plurality of data packets, second header data associated with individual ones of the second plurality of data packets, or second payload data associated with individual ones of the second plurality of data packets.

6. The system of claim 1, wherein the fourth data is further based on one or more of:

a first representation of a traffic shaper operating at the first ground station, a first actual traffic shaper operating at the first ground station, a second representation of a traffic shaper operating at the first satellite, or a second actual traffic shaper operating at the first satellite.

7. The system of claim 1, wherein the fourth data is further based on one or more of:

fifth data indicative of congestion at the first modem resulting in modified operation of a representation of the first modem, sixth data indicative of congestion at the second modem resulting in modified operation of a representation of the second modem, or seventh data indicative of congestion at the third modem resulting in modified operation of a representation of the third modem.

8. The system of claim 1, further comprising one or more of:

the first ground station to further:

determine that a buffer drain rate of a buffer of the first modem is less than a buffer fill rate of the first modem; and apply one or more traffic shaping techniques to the fourth data before the fourth data is sent to the first modem; or the first satellite to further:

determine that a buffer drain rate of a buffer of the second modem is less than a buffer fill rate of the second modem; and apply one or more traffic shaping techniques to the fourth data before at least a first portion of the fourth data is sent to the second modem.

9. A method comprising:

receiving first data at a facility;

receiving second data at the facility;

determining third data indicative of communication resources associated with delivery of the first data to a first user terminal (UT) and delivery of the second data to a second UT;

determining a representation of at least a portion of the communication resources;

determining, based on the representation, fourth data by processing the first data and the second data using one or more traffic shaping techniques;

determining that a buffer drain rate of a buffer of a first modem at a ground station is less than a buffer fill rate of the first modem;

responsive to the determining that the buffer drain rate of the buffer of the first modem at the ground station is less than the buffer fill rate of the first modem, determining fifth data by applying one or more traffic shaping techniques to the fourth data; and sending at least a portion of the fifth data to a first satellite using the first modem.

10. The method of claim 9, the determining the representation of the at least a portion of the communication resources further comprising:

determining a first UT representation;

determining a representation of a second modem that is indicated by the third data to deliver the first data to the first UT; and determining, based on the first UT representation having received the first data, the fourth data that is indicative of one or more traffic shaping techniques associated with delivery of the first data to the first UT representation using the representation of the second modem.

11. The method of claim 9, the one or more traffic shaping techniques comprising one or more of:

aggregating two or more packets of the first data, aggregating two or more packets of the second data, aggregating a first packet of the first data and a second packet of the second data, determining a first transmission order of the first data, determining a second transmission order of the second data, determining a third transmission order of a combination of at least a portion of the first data and at least a portion of the second data, determining a first transmission pacing of the first data, determining a second transmission pacing of the second data, or determining a third transmission pacing of a combination of at least a portion of the first data and at least a portion of the second data.

12. The method of claim 9, wherein the determining the fourth data is further based on one or more of:

first header data associated with individual packets of the first data, first payload data associated with individual packets of the first data, second header data associated with individual packets of the second data, or second payload data associated with individual packets of the second data.

13. The method of claim 9, wherein the determining the fourth data is further based on one or more of:

a first representation of a traffic shaper operating at the ground station, a first actual traffic shaper operating at the ground station, a second representation of a traffic shaper operating at the first satellite, or a second actual traffic shaper operating at the first satellite.

14. The method of claim 9, further comprising:

determining a predicted position of the first satellite; and determining a propagation delay indicative of a time for a signal to travel from the ground station, as specified by the third data, to the predicted position of the first satellite;

wherein the third data is based on the propagation delay.

15. The method of claim 9, further comprising:

sending the first data to the first UT using a second modem at the first satellite and the second data to the second UT using a third modem at the first satellite.

16. A system comprising one or more processors executing instructions to:

receive first data;

receive second data;

determine third data indicative of communication resources associated with delivery of the first data to a first user terminal (UT) and delivery of the second data to a second UT;

determine a representation of at least a portion of the communication resources;

determine, based on the representation, fourth data by processing the first data and the second data using one or more traffic shaping techniques;

determine that a buffer drain rate of a buffer of a first modem on a first satellite is less than a buffer fill rate of the first modem;

determine fifth data by applying, at the first satellite, one or more traffic shaping techniques to the fourth data; and send at least a portion of the fifth data to the first UT or the second UT using the first modem.

17. The system of claim 16, wherein the instructions to determine the representation comprise instructions to:

determine a first UT representation;

determine a representation of a second modem that is indicated by the third data to deliver the first data to the first UT; and determine, based on the first UT representation having received the first data, the fourth data that is indicative of one or more traffic shaping techniques associated with delivery of the first data to the first UT representation using the representation of the second modem.

18. The system of claim 16, the one or more traffic shaping techniques comprising instructions to one or more of:

aggregate two or more packets of the first data, aggregate two or more packets of the second data, aggregate a first packet of the first data and a second packet of the second data, determine a first transmission order of the first data, determine a second transmission order of the second data, determine a third transmission order of a combination of at least a portion of the first data and at least a portion the second data, determine a first transmission pacing of the first data, determine a second transmission pacing of the second data, or determine a third transmission pacing of a combination of at least a portion of the first data and at least a portion the second data.

19. The system of claim 16, wherein the third data is based on a propagation delay indicative of a time for a signal to travel from a first ground station indicated by the third data to a predicted position of the first satellite at a time when the signal is expected to reach the first satellite.

20. The system of claim 16, wherein the fourth data is further based on one or more of:

first header data associated with the first data, first payload data associated with the first data, second header data associated with the second data, or second payload data associated with the second data.

* * * * *